(12) United States Patent  
Park

(10) Patent No.: US 12,287,939 B2  
(45) Date of Patent: Apr. 29, 2025

(54) INPUT SENSING DEVICE AND DISPLAY DEVICE INCLUDING THE SAME

(71) Applicant: SAMSUNG DISPLAY CO., LTD., Yongin-Si (KR)

(72) Inventor: Youngmin Park, Yongin-Si (KR)

(73) Assignee: SAMSUNG DISPLAY CO., LTD., Yongin-Si (KR)

( * ) Notice: Subject to any disclaimer, the term of this patent is extended or adjusted under 35 U.S.C. 154(b) by 0 days.

(21) Appl. No.: 18/316,573

(22) Filed: May 12, 2023

(65) Prior Publication Data

US 2023/0367423 A1  Nov. 16, 2023

(30) Foreign Application Priority Data

May 13, 2022  (KR) .................. 10-2022-0059134

(51) Int. Cl.  
*G06F 3/041* (2006.01)

(52) U.S. Cl.  
CPC ...... *G06F 3/04182* (2019.05); *G06F 3/04186* (2019.05)

(58) Field of Classification Search  
CPC .......................... G06F 3/04182; G06F 3/04186  
See application file for complete search history.

(56) References Cited

U.S. PATENT DOCUMENTS

| 10,216,314 B2 | 2/2019 | Kremin et al. | |
|---|---|---|---|
| 2003/0151400 A1* | 8/2003 | Petrovich | G01H 13/00 324/76.52 |
| 2006/0017478 A1* | 1/2006 | Johnson | H03L 7/087 327/158 |
| 2010/0060593 A1* | 3/2010 | Krah | G06F 3/0446 345/173 |
| 2010/0289506 A1* | 11/2010 | Moon | H03K 17/955 324/681 |
| 2011/0061948 A1* | 3/2011 | Krah | G06F 3/041 178/18.01 |
| 2011/0063227 A1* | 3/2011 | Wu | G06F 3/04166 345/173 |
| 2012/0013545 A1* | 1/2012 | Philipp | G06F 3/041 345/173 |
| 2013/0207906 A1* | 8/2013 | Yousefpor | G06F 3/04166 345/173 |
| 2013/0285976 A1* | 10/2013 | Kuo | G06F 3/044 345/174 |
| 2013/0330017 A1* | 12/2013 | Elias | G06F 3/0418 382/254 |
| 2014/0285465 A1* | 9/2014 | Hayashi | G06F 3/04166 345/174 |
| 2014/0306901 A1* | 10/2014 | Takeuchi | G06F 3/0488 345/173 |

(Continued)

*Primary Examiner* — Ariel A Balaoing  
(74) *Attorney, Agent, or Firm* — F. CHAU & ASSOCIATES, LLC

(57) ABSTRACT

An input sensing device of a display device, which includes an input sensor including a transmit electrode and a receive electrode and a readout circuit that drives the input sensor. The readout circuit includes a phase adjustment circuit that outputs a phase adjustment signal corresponding to a delay characteristic of the transmit electrode and a transmitter that outputs a transmission signal, a phase of which is adjusted in response to the phase adjustment signal, to the transmit electrode.

20 Claims, 23 Drawing Sheets

(56) References Cited

U.S. PATENT DOCUMENTS

| | | | |
|---|---|---|---|
| 2014/0320450 A1* | 10/2014 | Lee | G06F 3/04184 |
| | | | 345/174 |
| 2015/0309603 A1* | 10/2015 | Kuo | G06F 3/041 |
| | | | 345/173 |
| 2016/0188105 A1* | 6/2016 | Kremin | G06F 3/041 |
| | | | 345/174 |
| 2017/0131848 A1* | 5/2017 | Yeh | G06F 3/0446 |
| 2019/0196629 A1* | 6/2019 | Shepelev | G06F 3/0412 |
| 2020/0012375 A1* | 1/2020 | Jeong | G06F 3/0412 |
| 2023/0161439 A1* | 5/2023 | Pirogov | G06F 3/0418 |
| | | | 345/178 |

* cited by examiner

FIG. 14A

|     | TE1  | TE2 | TE3 | TE4 |
|-----|------|-----|-----|-----|
| RE1 | 1000 | 999 | 998 | 998 |
| RE2 | 999  | 998 | 997 | 997 |
| RE3 | 998  | 997 | 997 | 997 |
| RE4 | 998  | 997 | 997 | 997 |

FIG. 14B

|     | TE1  | TE2 | TE3 | TE4 |
|-----|------|-----|-----|-----|
| RE1 | 1000 | 999 | 999 | 633 |
| RE2 | 999  | 998 | 998 | 630 |
| RE3 | 999  | 998 | 997 | 628 |
| RE4 | 999  | 998 | 997 | 628 |

FIG. 14C

|     | TE1  | TE2 | TE3 | TE4 |
|-----|------|-----|-----|-----|
| RE1 | 1000 | 999 | 999 | 352 |
| RE2 | 999  | 998 | 998 | 349 |
| RE3 | 999  | 998 | 997 | 348 |
| RE4 | 999  | 998 | 997 | 348 |

FIG. 15A

|     | TE1 | TE2 | TE3 | TE4 |
|-----|-----|-----|-----|-----|
| RE1 | 0   | 0   | 0   | 0   |
| RE2 | 0   | 0   | 0   | 0   |
| RE3 | 0   | 0   | 0   | 79  |
| RE4 | 0   | 0   | 0   | 0   |

FIG. 15B

|     | TE1 | TE2 | TE3 | TE4 |
|-----|-----|-----|-----|-----|
| RE1 | 0   | 0   | 0   | 0   |
| RE2 | 0   | 0   | 0   | 0   |
| RE3 | 0   | 0   | 0   | 50  |
| RE4 | 0   | 0   | 0   | 0   |

FIG. 15C

|     | TE1 | TE2 | TE3 | TE4 |
|-----|-----|-----|-----|-----|
| RE1 | 0   | 0   | 0   | 0   |
| RE2 | 0   | 0   | 0   | 0   |
| RE3 | 0   | 0   | 0   | 27  |
| RE4 | 0   | 0   | 0   | 0   |

FIG. 16A

|     | TE1  | TE2  | TE3  | TE4  |
|-----|------|------|------|------|
| RE1 | 1000 | 1000 | 1000 | 1000 |
| RE2 | 1000 | 1000 | 1000 | 1000 |
| RE3 | 1000 | 1000 | 1000 | 1000 |
| RE4 | 1000 | 1000 | 1000 | 1000 |

FIG. 16B

|     | TE1  | TE2  | TE3  | TE4 |
|-----|------|------|------|-----|
| RE1 | 1017 | 1020 | 1021 | 524 |
| RE2 | 1017 | 1020 | 1021 | 524 |
| RE3 | 1017 | 1020 | 1021 | 524 |
| RE4 | 1017 | 1020 | 1021 | 524 |

FIG. 16C

|     | TE1  | TE2  | TE3  | TE4 |
|-----|------|------|------|-----|
| RE1 | 1011 | 1013 | 1014 | 240 |
| RE2 | 1011 | 1013 | 1014 | 241 |
| RE3 | 1011 | 1013 | 1014 | 241 |
| RE4 | 1011 | 1013 | 1014 | 241 |

FIG. 17A

|     | TE1 | TE2 | TE3 | TE4 |
|-----|-----|-----|-----|-----|
| RE1 | 0   | 0   | 0   | 0   |
| RE2 | 0   | 0   | 0   | 0   |
| RE3 | 0   | 0   | 0   | 80  |
| RE4 | 0   | 0   | 0   | 0   |

FIG. 17B

|     | TE1 | TE2 | TE3 | TE4 |
|-----|-----|-----|-----|-----|
| RE1 | 0   | 0   | 0   | 0   |
| RE2 | 0   | 0   | 0   | 0   |
| RE3 | 3   | 3   | 3   | 43  |
| Rx4 | 0   | 0   | 0   | 0   | fCm1

FIG. 17C

|     | TE1 | TE2 | TE3 | TE4 |
|-----|-----|-----|-----|-----|
| RE1 | 0   | 0   | 0   | 0   |
| RE2 | 0   | 0   | 0   | 0   |
| RE3 | 2   | 2   | 2   | 20  |
| RE4 | 0   | 0   | 0   | 0   | fCm2

FIG. 20A

| PH | Normalized Capacitance | | |
|---|---|---|---|
| | Cm | dCm | fCm |
| 0 | 0.528 | 0.544 | 0.044 |
| 20 | 0.620 | 0.623 | 0.013 |
| 24 | 0.631 | 0.633 | 0.009 |
| 28 | 0.641 | 0.642 | 0.006 |
| 32 | 0.648 | 0.648 | 0.003 |
| 36 | 0.652 | 0.651 | 0.001 |
| 40 | 0.654 | 0.654 | 0.000 |
| 44 | 0.654 | 0.653 | 0.000 |
| 48 | 0.651 | 0.651 | 0.001 |
| 52 | 0.646 | 0.646 | 0.003 |

INPUT SENSING DEVICE AND DISPLAY DEVICE INCLUDING THE SAME

CROSS-REFERENCE TO RELATED APPLICATIONS

This application claims priority under 35 U.S.C. § 119 to Korean Patent Application No. 10-2022-0059134 filed on May 13, 2022, in the Korean Intellectual Property Office, the disclosures of which are incorporated by reference herein in their entireties.

TECHNICAL FIELD

Embodiments of the present disclosure described herein relate to a display device, and more particularly, relate to a display device including an input sensing device.

DISCUSSION OF RELATED ART

A multimedia electronic device such as a television, a portable phone, a tablet computer, a navigation system, and a game console includes a display device for displaying an image. Besides a general input method such as a button, a keyboard, or a mouse, multimedia electronic devices may include a touch screen that provides a touch-based input method allowing a user to easily enter information or commands intuitively and conveniently.

It is desirable for the touch screen to accurately detect the presence of user inputs and their locations at a desired sensitivity, and to minimize erroneous detections.

SUMMARY

Embodiments of the present disclosure provide an input sensing device that accurately senses user inputs, and a display device including the same.

According to an embodiment, an input sensing device may include an input sensor including a transmit electrode and a receive electrode and a readout circuit that drives the input sensor. The readout circuit may include a phase adjustment circuit ("phase adjuster") that outputs a phase adjustment signal corresponding to a delay characteristic of the transmit electrode; and a transmitter that outputs a transmission signal, a phase of which is adjusted in response to the phase adjustment signal, to the transmit electrode.

In various embodiments:

The transmission signal may be a sine wave.

The readout circuit may further include a receiver that receives a reception signal from the receive electrode and output a reception sensing signal.

The input sensing device may further include a transmission line electrically connecting the transmit electrode with the transmitter and a reception line electrically connecting the receive electrode with the receiver.

The phase adjuster may output the phase adjustment signal based on a phase difference between the transmission signal and the reception sensing signal.

The phase adjuster may include a phase shifter that shifts a phase of the transmission signal and outputs the shifted transmission signal, a first operator that calculates the reception sensing signal and the transmission signal, a first filter that filters an output of the first operator and outputs a first signal, a second operator that calculates the reception sensing signal and the shifted transmission signal, a second filter that filters an output of the second operator and outputs a second signal, and a phase calculator that outputs the phase adjustment signal based on the first signal and the second signal.

Each of the first filter and the second filter may be a low pass filter.

The transmit electrode may include a first transmit electrode and a second transmit electrode. The transmitter may output a first transmission signal corresponding to a first code to the first transmit electrode and may output a second transmission signal corresponding to a second code different from the first code to the second transmit electrode.

The first transmission signal and the second transmission signal may have different phases (the first and second transmission signals are offset in phase from one another).

The phase adjustment signal may include a first phase adjustment signal and a second phase adjustment signal. The transmitter may output the first transmission signal, a phase of which is adjusted in response to the first phase adjustment signal, to the first transmit electrode and may output the second transmission signal, a phase of which is adjusted in response to the second phase adjustment signal, to the second transmit electrode.

A first phase corresponding to the first phase adjustment signal may be less than a phase difference between the first transmission signal and the second transmission signal. A second phase corresponding to the second phase adjustment signal may be less than the phase difference between the first transmission signal and the second transmission signal.

According to an embodiment, a display device may include a display panel, an input sensor disposed on the display panel and including a transmit electrode and a receive electrode, and a readout circuit that outputs a transmission signal to the transmit electrode and receives a reception signal from the receive electrode. The readout circuit may include a phase adjustment circuit that outputs a phase adjustment signal corresponding to a delay characteristic of the transmit electrode and a transmitter that outputs the transmission signal, a phase of which is adjusted in response to the phase adjustment signal, to the transmit electrode.

According to another embodiment, there is provided a method for calibrating an input sensing device including an input sensor having a transmit electrode comprising a plurality of transmit sub-electrodes, and a receive electrode comprising a plurality of receive sub-electrodes, a transmitter that outputs a transmission signal to the transmit electrode and a receiver that receives a reception sensing signal from the receive electrode. The method includes setting a relative phase for each first transmission signal to be output to a first transmit sub-electrode among the plurality of transmit sub-electrodes, with respect to a phase of at least one further transmission signal to be output to at least one further transmit sub-electrode among the plurality of transmit sub-electrodes. The relative phase may be set by measuring a false capacitance of the first transmit sub-electrode based on a measurement of a phase difference between a test transmission signal applied to the first transmit sub-electrode and a test reception sensing signal received by a first one of the receive sub-electrodes, and determining a relative phase that minimizes false capacitance between the first transmit electrode and the first one of the receive sub-electrodes.

BRIEF DESCRIPTION OF THE DRAWINGS

The above and other features of the present disclosure will become apparent by describing in detail embodiments thereof with reference to the accompanying drawings.

FIGS. 14A, 14B, and 14C are tables listing example capacitances between first to fourth transmit electrodes and first to fourth receive electrodes when each of the first to fourth transmission signals is a pulse wave and when there is no external user input.

FIGS. 15A, 15B, and 15C are tables listing example amounts of capacitance change between first to fourth transmit electrodes and first to fourth receive electrodes when each of the first to fourth transmission signals is a pulse wave and when there is an external user input.

FIGS. 16A, 16B, and 16C are tables listing example capacitances between first to fourth transmit electrodes and first to fourth receive electrodes when each of the first to fourth transmission signals is a sine wave and when there is no external user input.

FIGS. 17A, 17B, and 17C are tables listing example amounts of capacitance change between first to fourth transmit electrodes and first to fourth receive electrodes when each of the first to fourth transmission signals is a sine wave and when there is an external user input.

FIG. 20A is a table listing example capacitances according to a phase adjustment signal.

DETAILED DESCRIPTION

Figure 1:
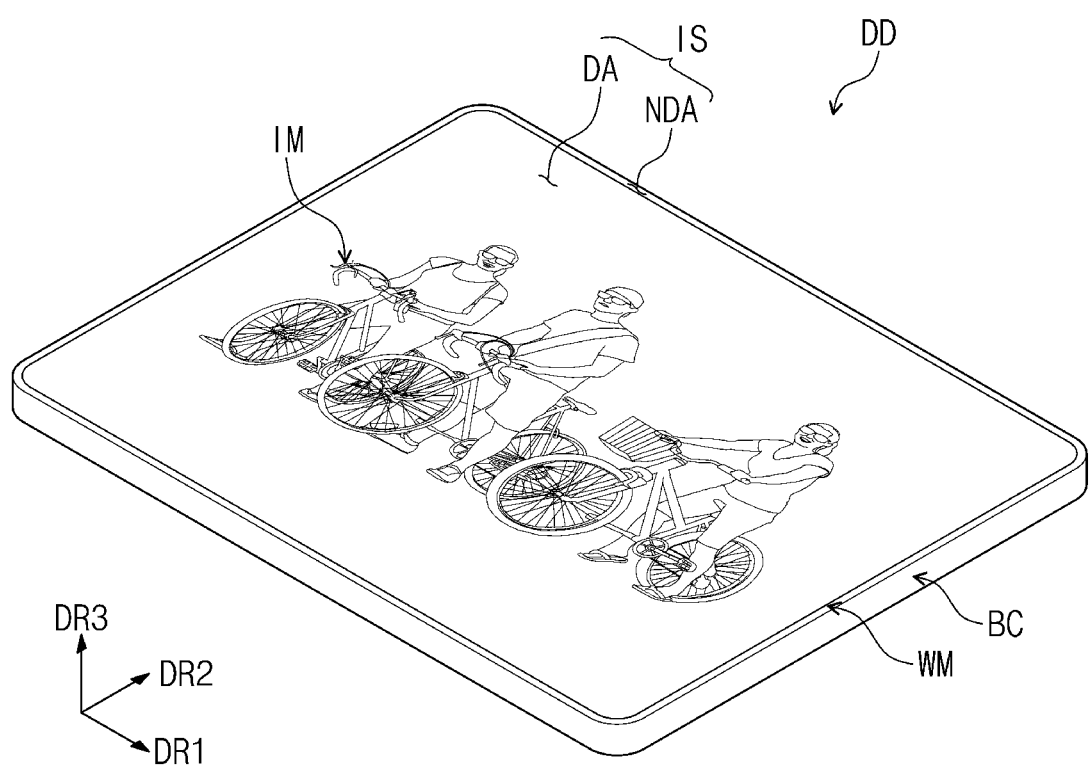
FIG. 1 is a perspective view of a display device according to an embodiment of the present disclosure.

In the specification, the expression that a first component (or region, layer, part, etc.) is "on", "connected with/to", or "coupled with/to" a second component means that the first component is directly on, connected with/to, or coupled with/to the second component or means that a third component is interposed therebetween.

Like reference numerals refer to like elements. Also, in the drawings, the thicknesses, the ratios, and the dimensions of the components may be exaggerated for effective description of technical contents. The expression "and/or" includes all combinations of one or more of the associated listed items.

Although terms generally denoting order such as "first", "second", or the like may be used herein to describe various elements, these terms are only used to distinguish one component from another component and do not necessarily signify any order. The articles "a," "an," and "the" are singular in that they have a single referent, but the use of the singular form in the specification should not preclude the presence of more than one referent.

Also, the terms "under", "beneath", "on", "above", etc. are used to describe a relationship between components illustrated in a drawing. These terms are relative concepts and are described on the basis of the directions shown in the drawings.

It should be further understood that the terms "includes/comprises" or "have" etc. specify the presence of stated features, integers, steps, operations, elements, parts, or combinations thereof, but do not preclude the possibility of the presence or addition of one or more other features, integers, steps, operations, elements, parts or combinations thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to the accompanying drawings.

Figure 2:
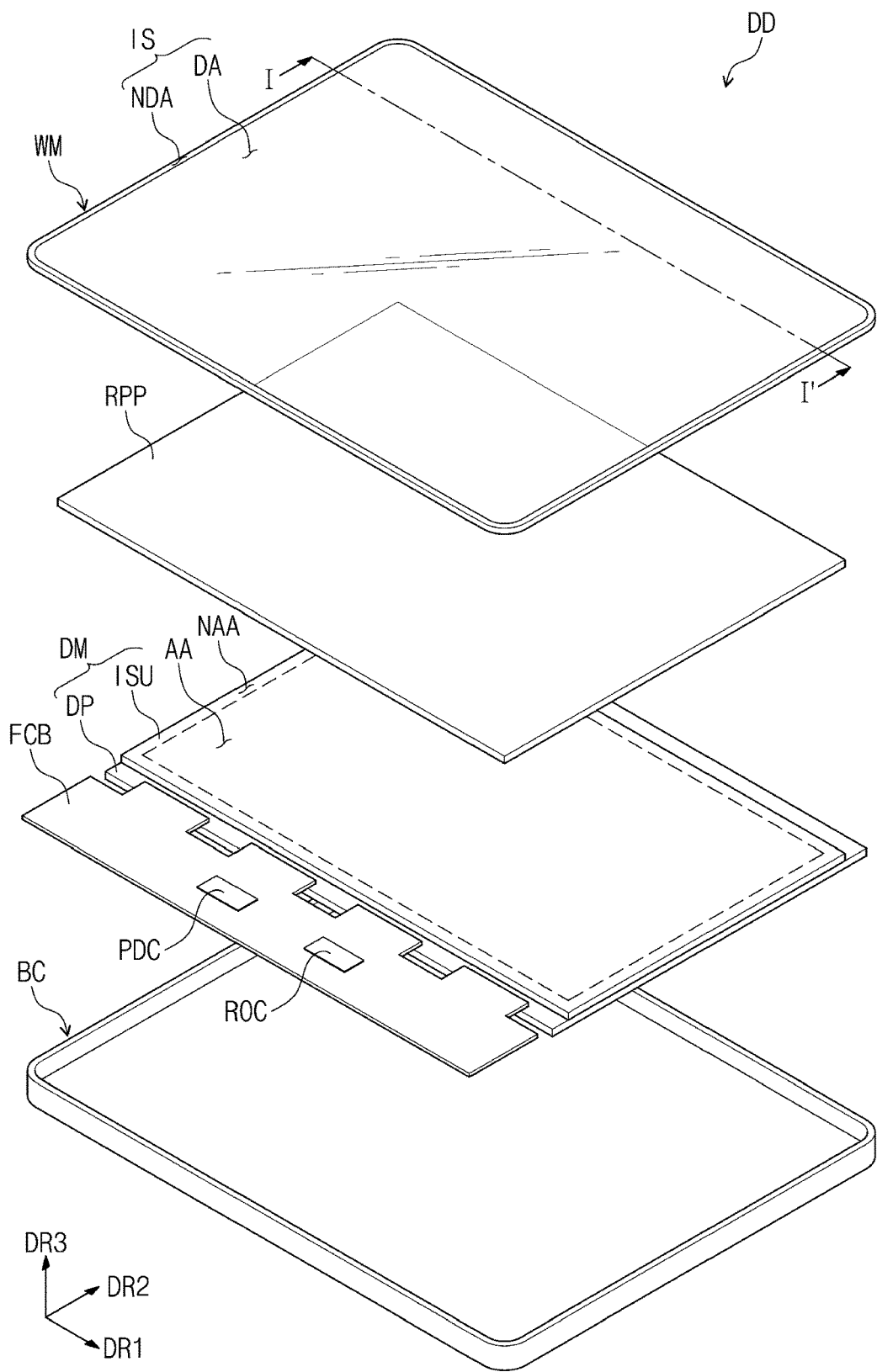
FIG. 2 is an exploded perspective view of a display device according to an embodiment of the present disclosure.

FIG. 1 is a perspective view of a display device according to an embodiment of the present disclosure. FIG. 2 is an exploded perspective view of a display device according to an embodiment of the present disclosure.

Referring to FIGS. 1 and 2, a display device DD may be a device which is activated according to an electrical signal. According to the present disclosure, the display device DD may be a large-size display device, such as a television or a monitor, or a small-to-medium size display device, such as a mobile phone, a tablet, a laptop, a car navigation system, or a game console. The above examples are provided only as an embodiment, and it is obvious that the display device DD may include any other display device(s) without departing from the concept of the present disclosure. The display device DD is in the shape of a rectangle which has a long edge in a first direction DR1 and has a short edge in a second direction DR2 crossing the first direction DR1. However, the shape of the display device DD is not limited thereto, and the display device DD may be provided in various shapes. The display device DD may display an image IM towards a third direction DR3 on a display surface IS parallel to each of the first direction DR1 and the second direction DR2. The display surface IS on which the image IM is displayed may correspond to a front surface of the display device DD.

In an embodiment, a front surface (or an upper surface) and a rear surface (or a lower surface) of each member are defined with respect to a direction in which the image IM is displayed. The front surface and the rear surface may be opposing to each other in the third direction DR3, and a normal direction of each of the front surface and the rear surface may be parallel to the third direction DR3.

A separation distance between the front surface and the rear surface in the third direction DR3 may correspond to a thickness of the display device DD in the third direction DR3. Meanwhile, directions indicated by the first, second, and third directions DR1, DR2, and DR3 may be a relative concept, which may change to different directions.

The display device DD may detect an external input applied from the outside. The external input may include various types of inputs provided from the outside of the display device DD. The display device DD according to an embodiment of the present disclosure may detect an external user input, which is applied from the outside. The external user input may include any one of various external inputs, such as a part of a user's body (e.g., the user's finger), light, heat, a gaze, or pressure, or the combination thereof. Furthermore, the display device DD may detect the external user input, which is applied to the side surface or the rear surface of the display device DD depending on the structure of the display device DD, but not limited to any one embodiment. As an example of the present disclosure, the external input may include an input by an input device (e.g., a stylus pen, an active pen, a touch pen, an electronic pen, or an E-pen). The input device may provide a capacitive input.

The display surface IS of the display device DD may be divided into a display area DA and a non-display area NDA. The display area DA may be an area in which the image IM is displayed. The user views the image IM through the display area DA. In an embodiment, the display area DA is illustrated in the shape of a rectangle, vertices of which are rounded. However, this is illustrated as an example. The display area DA may have various shapes, but not limited to any one embodiment.

The non-display area NDA may be adjacent to the display area DA. The non-display area NDA may have a certain color. The non-display area NDA may surround the display area DA. As such, the shape of the display area DA may be defined substantially by the non-display area NDA. However, this is illustrated as an example. The non-display area NDA may be disposed adjacent to only one side of the display area DA or may be omitted. The display device DD according to an embodiment of the present disclosure may include various embodiments, but not limited to any one embodiment.

As illustrated in FIG. 2, the display device DD may include a display module DM and a window WM disposed on the display module DM. The display module DM may include a display panel DP and an input sensor ISU.

The display panel DP according to an embodiment of the present disclosure may be a light emitting display panel. As an example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot, a quantum rod, and the like. Hereinafter, in an embodiment, the display panel DP will be described as the organic light emitting display panel.

The display panel DP may output the image IM, and the output image IM may be displayed on the display surface IS.

The input sensor ISU may be disposed on the display panel DP to sense an external input. The input sensor ISU may be directly disposed on the display panel DP. According to an embodiment of the present disclosure, the input sensor ISU may be formed on the display panel DP through a continuous process. In other words, when the input sensor ISU is directly disposed on the display panel DP, an inner adhesive film (not illustrated) is not disposed between the input sensor ISU and the display panel DP. However, the inner adhesive film may be disposed between the input sensor ISU and the display panel DP. In this case, the input sensor ISU is not manufactured by a process continuous with that of the display panel DP, which may be manufactured through a process independent of that of the display panel DP and may then be fixed on an upper surface of the display panel DP by the inner adhesive film.

The window WM may be formed of a transparent material capable of outputting the image IM. For example, the window WM may be formed of glass, sapphire, plastic, or the like. The window WM is illustrated as a single layer, but not limited thereto. The window WM may include a plurality of layers.

Meanwhile, although not illustrated, the non-display area NDA of the above-mentioned display device DD may be substantially provided as an area in which a material including a certain color is printed on one area of the window WM. As an example of the present disclosure, the window WM may include a light shielding pattern for defining the non-display area NDA. The light shielding pattern may be a colored organic film and may be formed, for example, in a coating manner.

The window WM may be coupled to the display module DM through an adhesive film. As an example of the present disclosure, the adhesive film may include an optically clear adhesive (OCA) film. However, the adhesive film is not limited thereto, which may include a typical adhesive or sticking agent. For example, the adhesive film may include an optically clear resin (OCR) film or a pressure sensitive adhesive (PSA) film.

An anti-reflector RPP may be further disposed between the window WM and the display module DM. The anti-reflector RPP may reduce the reflectance of external light incident from the upper side of the window WM. The anti-reflection layer according to an embodiment of the present disclosure may include a retarder and a polarizer. In an embodiment, the anti-reflection layer may also include color filters. An array of color filters may be determined with regard to colors of lights generated by a plurality of pixels PX (refer to FIG. 5) included in the display panel DP. The anti-reflection layer may further include a light shielding pattern. In an embodiment of the present disclosure, the anti-reflector RPP may be omitted or may be embedded in the display module DM.

The display module DM may display the image IM depending on an electrical signal and may transmit/receive information about the external input. The display module DM may be defined as an active area AA and a peripheral area NAA. The active area AA may be defined as an area which outputs the image IM provided from the display module DM. Furthermore, the active area AA may be defined as an area in which the input sensor ISU senses an external input applied from the outside.

The peripheral area NAA may be adjacent to the active area AA. For example, the peripheral area NAA may surround the active area AA. However, this is illustrated as an example. The peripheral area NAA may be defined in various shapes, but is not limited to any one embodiment. According to an embodiment, the active area AA of the display module DM may correspond to at least a portion of the display area DA.

The display module DM may further include a circuit board FCB. The circuit board FCB may be a flexible printed circuit board. The circuit board FCB may be electrically connected with the display panel DP. The circuit board FCB may include a plurality of driving elements. The plurality of driving elements may include a panel driving circuit PDC for driving the display panel DP and a readout circuit ROC for driving the input sensor ISU.

The panel driving circuit PDC may be electrically connected with the display panel DP through the circuit board FCB, and the readout circuit ROC may be electrically connected with the input sensor ISU through the circuit board FCB.

In an embodiment, the input sensor ISU and the readout circuit ROC may be an input sensing device. The input sensor ISU and the readout circuit ROC will be described in detail below.

The display device DD may further include an external case BC which receives the display module DM. The external case BC may be coupled to the window WM to define the appearance of the display device DD. The external case BC may absorb an impact applied from the outside and may prevent a foreign substance/moisture or the like from infiltrating into the display module DM to protect components received in the external case BC. Meanwhile, as an example of the present disclosure, the external case BC may be provided in the form of a combination of a plurality of receiving members.

The display device DD according to an embodiment may further include an electronic module including various functional modules for operating the display module DM, a power supply module (e.g., a battery) for supplying power necessary for the overall operation of the display device DD, a bracket coupled to the display module DM and/or the external case BC to partition an inner space of the display device DD, or the like.

Figure 3:
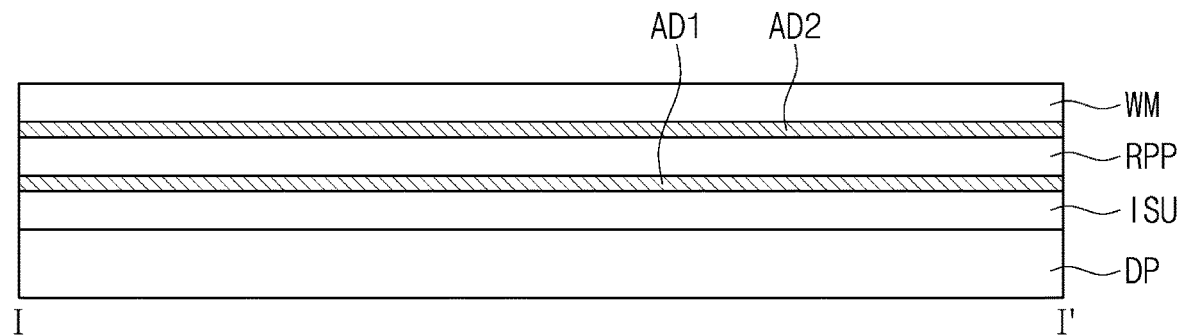
FIG. 3 is a cross-sectional view taken along the line I-I' illustrated in FIG. 2.
Figure 3:
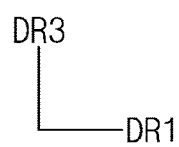

FIG. 3 is a cross-sectional view taken along the line I-I' illustrated in FIG. 2.

In FIG. 3, the components of a display device DD are simply illustrated to explain their stacking relationship.

The display device DD according to an embodiment of the present disclosure may include a display panel DP, an input sensor ISU, an anti-reflector RPP, and the window WM. At least some of the display panel DP, the input sensor ISU, the anti-reflector RPP, and the window WM may be formed by a continuous process or may be coupled to one another through an adhesive member. For example, the input sensor ISU and the anti-reflector RPP may be coupled to each other by an adhesive member AD1. The anti-reflector RPP and the window WM may be coupled by an adhesive member AD2.

The adhesive members AD1 and AD2 are transparent adhesive members such as a pressure sensitive adhesive film (PSA), an optically clear adhesive film (OCA), or an optically clear adhesive resin (OCR). The adhesive member described below may include a typical adhesive or sticking agent. In an embodiment of the present disclosure, the anti-reflector RPP and the window WM may be replaced with other components or may be omitted.

In FIG. 3, the input sensor ISU formed through the process continuous with that of the display panel DP may be disposed directly on the display panel DP. In the specification, "that component B is disposed directly on component A" means that a separate adhesive layer/adhesive member is not disposed between component A and component B. Component B is formed through a continuous process on the base surface provided by component A after component A is formed.

In an embodiment, the anti-reflector RPP and the window WM are provided in a "panel" type, and the input sensor ISU is provided in a "layer" type. The "panel" type includes a base layer providing a base surface, for example, a synthetic resin film, a composite material film, a glass substrate, or the like, whereas the "layer" type may omit the base layer. In other words, components of the "layer" type are disposed on the base surface provided by another component. In an embodiment of the present disclosure, the anti-reflector RPP and the window WM may be of the "layer" type.

The display panel DP may generate an image, and the input sensor ISU may obtain coordinate information of an external input (e.g., a touch event). Although not illustrated separately, the display device DD according to an embodiment of the present disclosure may further include a protective member disposed on the lower surface (or the rear surface) of the display panel DP. The protective member and the display panel DP may be coupled by means of an adhesive member.

The display panel DP according to an embodiment of the present disclosure may be a light emitting display panel, but not particularly limited thereto. For example, the display panel DP may be an organic light emitting display panel or a quantum dot light emitting display panel. The panels are distinguished according to the constituent material of the light emitting element. A light emitting layer of the organic light emitting display panel may include an organic light emitting material. A light emitting layer of the quantum dot light emitting display panel may include a quantum dot, a quantum rod, and/or the like. Hereinafter, the display panel DP will be described as an organic light emitting display panel.

The anti-reflector RPP may reduce the reflectance of external light incident from the upper side of the window WM. The anti-reflector RPP according to an embodiment of the present disclosure may include a retarder and a polarizer. The retarder may be provided in a film type or a liquid crystal coating type. The polarizer may also be provided in the film type or the liquid coating type. The film type may include a stretch-type synthetic resin film, and the liquid crystal coating type may include liquid crystals arranged in a certain arrangement. Each of the retarder and the polarizer may further include a protective film. The retarder and the polarizer itself or the protective film may be defined as the base layer of the anti-reflector RPP.

The anti-reflector RPP according to an embodiment of the present disclosure may include color filters. The color filters have a certain arrangement. An arrangement of the color filters may be determined with regard to light emitting colors of pixels included in the display panel DP. The anti-reflector RPP may further include a black matrix adjacent to the color filters.

The anti-reflector RPP according to an embodiment of the present disclosure may be a destructive interference structure. For example, the destructive interference structure may include a first reflective layer and a second reflective layer, which are arranged on different layers. The first reflected light and the second reflected light respectively reflected from the first reflective layer and the second reflective layer may destructively interfere with each other, and thus external light reflectance is reduced.

The window WM according to an embodiment of the present disclosure may include a glass substrate, a synthetic resin film, and/or the like. The window WM is not limited to a single layer. The window WM may include two or more films coupled by an adhesive member. Although not illustrated separately, the window WM may further include a functional coating layer. The functional coating layer may include an anti-fingerprint layer, an anti-reflection layer, a hard coating layer, and the like.

The input sensor ISU and the display panel DP will be described in detail below.

Figure 4:
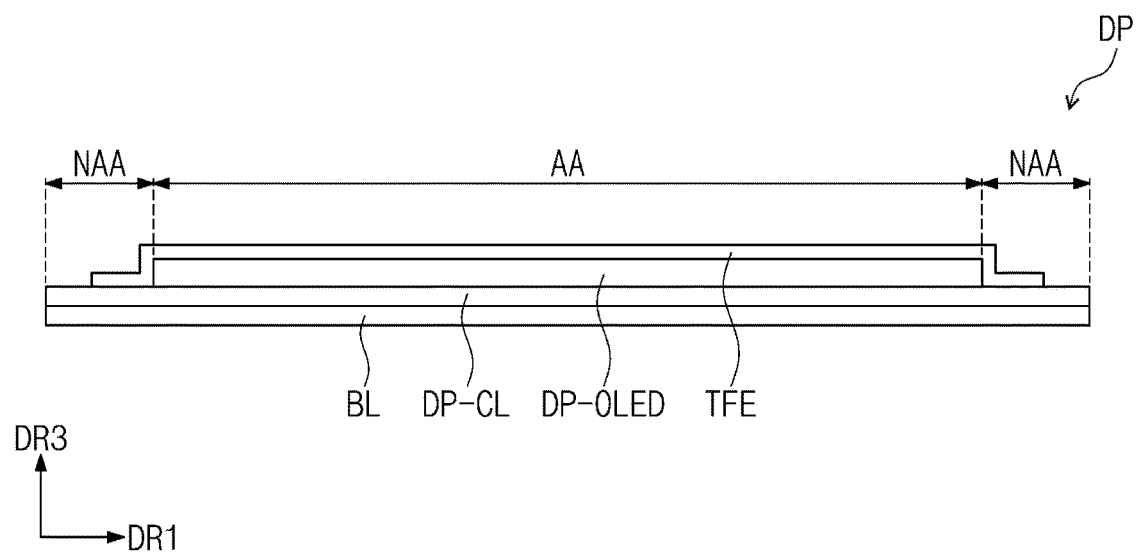
FIG. 4 is a cross-sectional view of a display panel illustrated in FIG. 3.

FIG. 4 is a cross-sectional view of a display panel DP illustrated in FIG. 3.

As illustrated in FIG. 4, the display panel DP may include a base layer BL, a circuit element layer DP-CL disposed on the base layer BL, a light emitting element layer DP-OLED, and a thin film encapsulation layer TFE. An active area AA and a peripheral area NAA corresponding to an image area DD-DA and a bezel area DD-NDA illustrated in FIG. 1 may be defined in the display panel DP. Herein, the phrase "first region/portion corresponds to a second region/portion" or the like means that the first and second regions/portions overlap each other, where the overlap may be a partial or a complete overlap (the first and second regions/portions are not limited to having the same area and/or the same shape).

The base layer BL may include at least one synthetic resin film. The base layer BL may include a glass substrate, a metal substrate, an organic/inorganic composite material substrate, or the like.

The circuit element layer DP-CL may be disposed on the base layer BL. The circuit element layer DP-CL may include at least one insulating layer and circuit elements. The insulating layer may include at least one inorganic layer and at least one organic layer. The circuit elements may include signal lines, a pixel driving circuit, and the like.

The light emitting element layer DP-OLED may be disposed on the circuit element layer DP-CL. The light emitting element layer DP-OLED may include organic light emitting diodes. The light emitting element layer DP-OLED may further include an organic layer such as a pixel definition layer.

The thin film encapsulation layer TFE may be disposed on the light emitting element layer DP-OLED to encapsulate the light emitting element layer DP-OLED. The thin film encapsulation layer TFE may entirely cover the active area AA. The thin film encapsulation layer TFE may cover a portion of the peripheral area NAA.

The thin film encapsulation layer TFE may include a plurality of thin films. Some thin films may be arranged to improve optical efficiency, and the others may be arranged to protect organic light emitting diodes.

Figure 5:
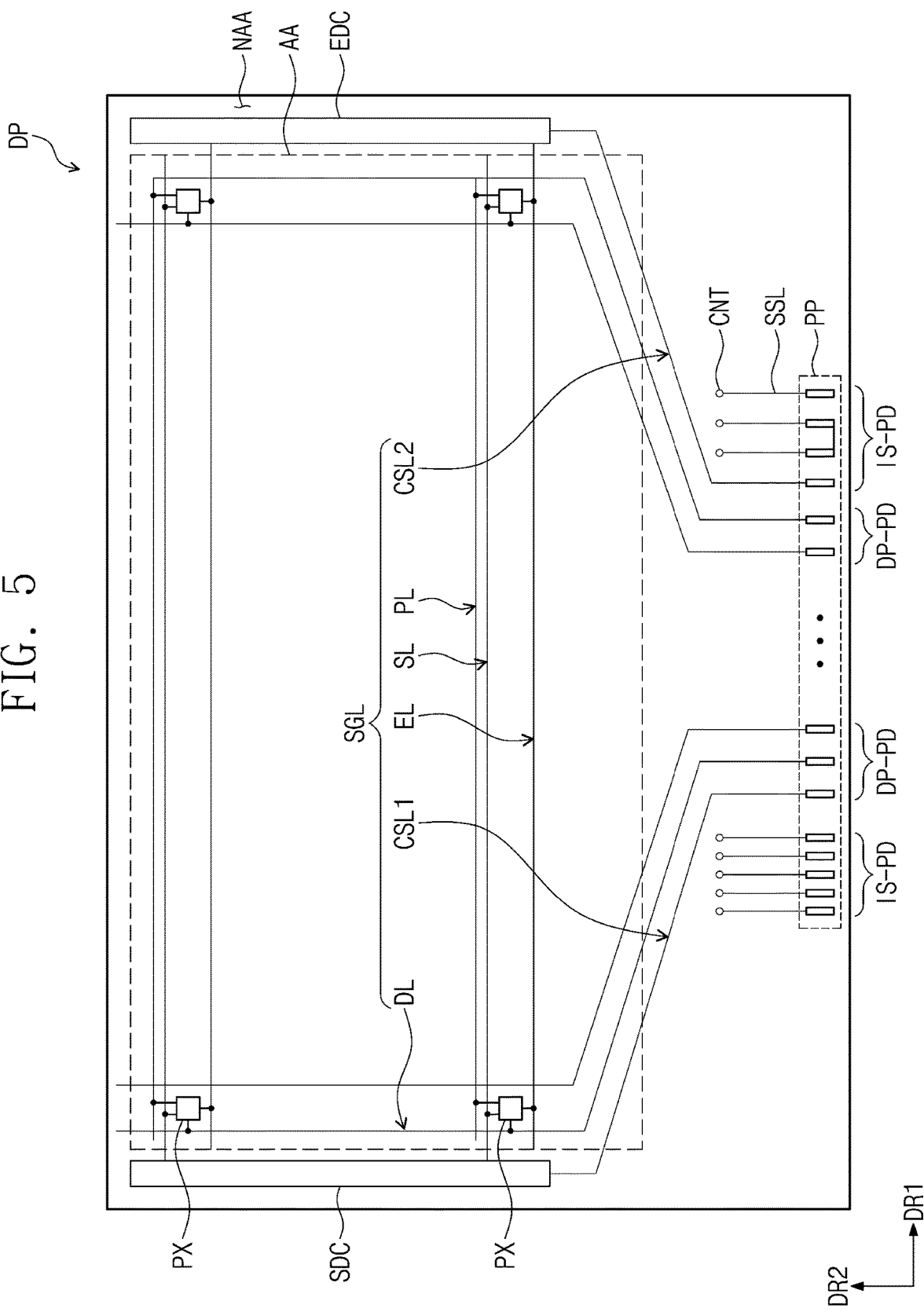
FIG. 5 is a plan view of a display panel according to an embodiment of the present disclosure.

FIG. 5 is a plan view of a display panel DP according to an embodiment of the present disclosure. The display panel DP may include a scan driving circuit SDC, a light emitting driving circuit EDC, a plurality of signal lines SGL (hereinafter, referred to as "signal lines"), a plurality of signal pads DP-PD and IS-PD (hereinafter, referred to as "signal pads"), and a plurality of pixels PX (hereinafter, referred to as "pixels").

The scan driving circuit SDC may generate a plurality of scan signals (hereinafter, referred to as "scan signals") and may sequentially output the scan signals to a plurality of scan lines SL (hereinafter, referred to as "scan lines") to be described below.

The light emitting driving circuit EDC may generate a plurality of light emitting control signals (hereinafter, referred to as "light emitting control signals") and may sequentially output the light emitting control signals to a plurality of light emitting control lines EL (hereinafter, referred to as light emitting control lines) to be described below.

In an embodiment, the scan driving circuit SDC and the light emitting driving circuit EDC may be electrically connected with a panel driving circuit PDC illustrated in FIG. 2. The scan driving circuit SDC and the light emission driving circuit EDC may operate under control of the panel driving circuit PDC.

The scan driving circuit SDC and the light emitting driving circuit EDC may include a plurality of transistors formed through the same process as that of transistors in the pixels PX.

The signal lines SGL may include scan lines SL, data lines DL, a power line PL, light emitting control lines EL, and control signal lines CSL1 and CSL2. Each of the scan lines SL, data lines DL, and light emitting control lines EL may be connected with the corresponding pixel PX among the pixels PX. The power line PL may be connected in common with the pixels PX. The control signal line CSL1 may provide control signals to the scan driving circuit SDC. The control signal line CSL2 may provide control signals to the light emitting driving circuit EDC. The power line PL may supply a voltage necessary for operations of the pixels PX. The power line PL may include a plurality of lines which provide different voltages.

In an embodiment, the signal lines SGL may further include auxiliary lines SSL. In an embodiment of the present disclosure, the auxiliary lines SSL may be omitted. The auxiliary lines SSL are connected with contact holes CNT, respectively. The auxiliary lines SSL may be electrically connected with signal lines of an input sensor ISU (refer to FIG. 6) to be described below through the contact holes CNT.

The display panel DP may include a pad area PP. The plurality of signal pads DP-PD and IS-PD may be arranged in the pad area PP of the display panel DP. The signal pads DP-PD and IS-PD may include first type signal pads DP-PD connected with the data lines DL, the power line PL, and the control signal line CSL1 and CSL2 and second type signal pads IS-PD connected with the auxiliary lines SSL. The first type signal pads DP-PD and the second type signal pads IS-PD are arranged adjacent to each other in the pad area PP defined in a portion of the peripheral area NAA. Laminated structures or constituent materials of the signal pads DP-PD and IS-PD may be formed through the same process without being separated from each other. The first type signal pads DP-PD and the second type signal pads IS-PD may be electrically connected with a circuit board FCB illustrated in FIG. 2.

The active area AA may be defined as an area in which the pixels PX are arranged. A plurality of electronic elements may be arranged in the active area AA. The electronic elements may include an organic light emitting diode provided in each of the pixels PX and a pixel driving circuit connected therewith. The scan driving circuit SDC, the light emitting driving circuit EDC, the signal lines SGL, the signal pads DP-PD and IS-PD, and the pixel driving circuit may be included in a circuit element layer DP-CL illustrated in FIG. 4.

Although not illustrated in the drawing, each of the pixels PX may include a plurality of transistors, a capacitor, and an organic light emitting diode. The pixels PX may emit light in response to signals received through the scan lines SL, the data lines DL, the light emitting control lines EL, and the power line PL.

In an embodiment, the display panel DP may further include a data driving circuit. In an embodiment, the data driving circuit may be disposed between the active area AA and the pad area PP. The data driving circuit may be electrically connected with the pixels PX through the data lines DL to provide data signals to the pixels PX.

In an embodiment, the data driving circuit may be disposed on the circuit board FCB illustrated in FIG. 2.

Figure 6:
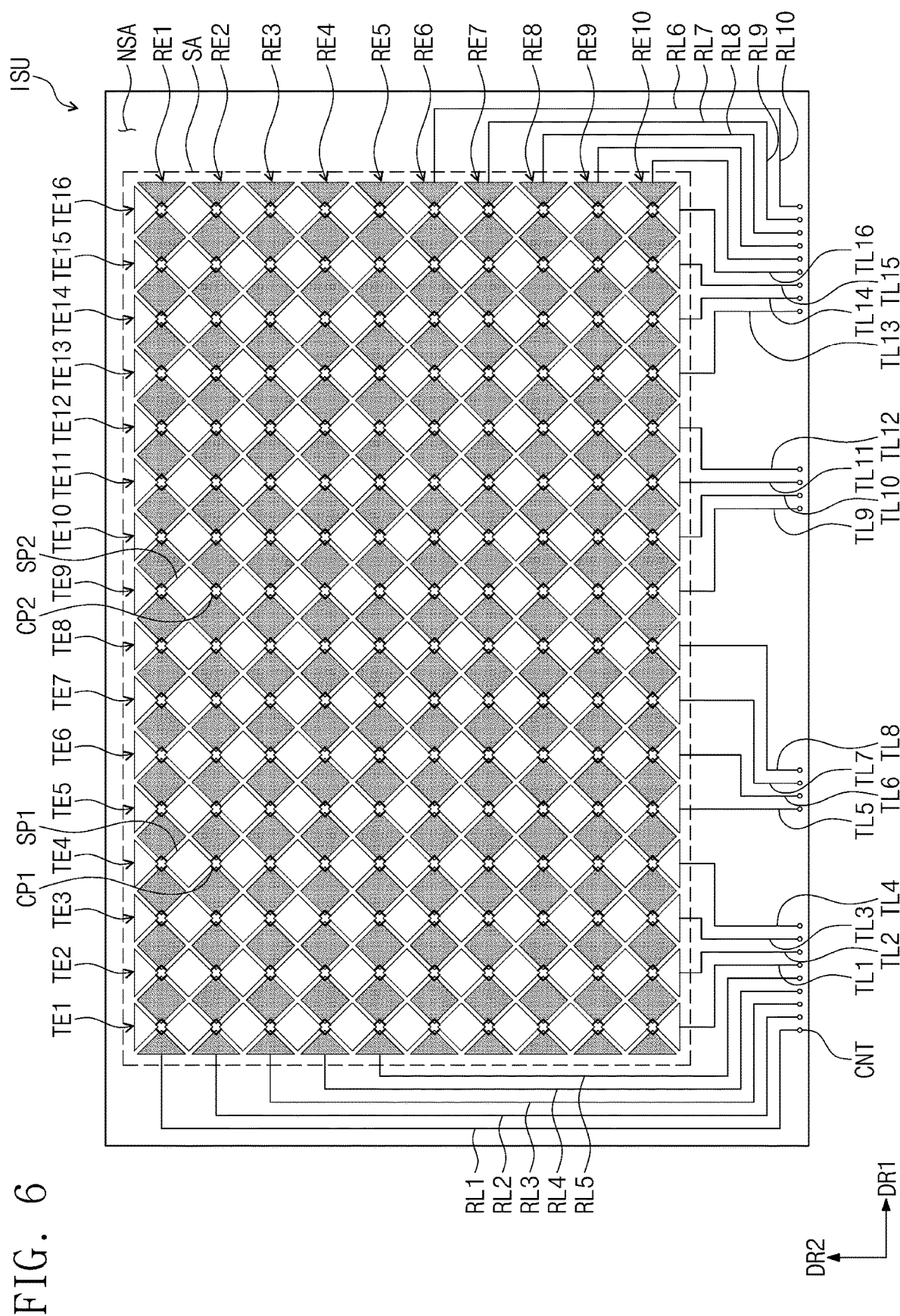
FIG. 6 is a plan view illustrating a configuration of an input sensor according to an embodiment of the present disclosure.

FIG. 6 is a plan view illustrating a configuration of an input sensor ISU according to an embodiment of the present disclosure.

Referring to FIG. 6, the input sensor ISU may include a sensing area SA and a non-sensing area NSA. The sensing area SA may be an area which is activated according to an electrical signal. For example, the sensing area SA may be an area for sensing an input. The non-sensing area NSA may surround the sensing area SA. The sensing area SA may correspond to an active area AA of FIG. 5, and the non-sensing area NSA may correspond to a peripheral area NAA of FIG. 5.

The input sensor ISU may include first to sixteenth transmit electrodes TE1-TE16 and first to tenth receive electrodes RE1-RE10. The first to sixteenth transmit electrodes TE1-TE16 and the first to tenth receive electrodes RE1-RE10 may be arranged in the sensing area SA. The first to sixteenth transmit electrodes TE1-TE16 and the first to tenth receive electrodes RE1-RE10 may be electrically insulated from each other to cross each other in the sensing area SA. As an example of the present disclosure, the input sensor ISU includes the first to sixteenth transmit electrodes TE1-TE16 and the first to tenth receive electrodes RE1-RE10, but the present disclosure is not limited thereto. The number of the transmit electrodes and the number of the receive electrodes may be variously changed. Although it is illustrated in FIG. 6 that the number of the transmit electrodes is greater than the number of the receive electrodes, in an embodiment, the number of transmit electrodes may be greater than or equal to the number of receive electrodes.

The electrodes TE1-TE16 are referred to as transmit electrodes and the electrodes RE1-RE10 are referred to as receive electrodes to clearly distinguish the electrodes TE1-TE16 from the electrodes RE1-RE10 in the specification, but the present disclosure is not limited to names in functions of the electrodes TE1-TE16 and the electrodes RE1-RE10. According to operation modes, the transmit electrodes TE1-TE16 may operate as receive electrodes as well as transmit electrodes, and the receive electrodes RE1-RE10 may operate as transmit electrodes as well as receive electrodes.

Each of the first to sixteenth transmit electrodes TE1-TE16 may extend in a second direction DR2. The first to sixteenth transmit electrodes TE1-TE16 may be arranged spaced apart from each other in a first direction DR1. The first to sixteenth transmit electrodes TE1-TE16 may be electrically separated from each other. Each of the first to sixteenth transmit electrodes TE1-TE16 may include first sensing patterns SP1 arranged spaced apart from each other in the first direction DR1 and first connection patterns CP1 which electrically connect the first sensing patterns SP1. The first sensing patterns SP1 and the first connection patterns CP1 may be arranged on different layers and may fail to have an integral shape.

Each of the first to tenth receive electrodes RE1-RE10 extends in the first direction DR1. The first to tenth receive electrodes RE1-RE10 may be arranged spaced apart from each other in the second direction DR2. The first to tenth receive electrodes RE1-RE10 may be electrically separated from each other. The first to tenth receive electrodes RE1-RE10 may be arranged to cross with the first to sixteenth transmit electrodes TE1 and may be electrically insulated from the first to sixteenth transmit electrodes TE1-TE16. Each of the first to tenth receive electrodes RE1-RE10 may include second sensing patterns SP2 arranged spaced apart from each other in the first direction DR1 and second connection patterns CP2 which electrically connect the second sensing patterns SP2. The second sensing patterns SP2 and the second sensing patterns SP2 may have an integral shape.

Each of the first sensing patterns SP1 and the second sensing patterns SP2 is illustrated in a diamond shape in FIG. 6, but the present disclosure is not limited thereto. The first sensing patterns SP1 and the second sensing patterns SP2 may have different polygonal shapes.

Each of the first to sixteenth transmit electrodes TE1-TE16 and the first to tenth receive electrodes RE1-RE10 may have a mesh shape. As each of the first to sixteenth transmit electrodes TE1-TE16 and the first to tenth receive electrodes RE1-RE10 has the mesh shape, a parasitic capacitance between electrodes (e.g., second electrode CE (refer to FIG. 7)) of a display panel DP (refer to FIG. 5) may be reduced.

The input sensor ISU may obtain location information about an external input by means of a change in mutual capacitance between the first to sixteenth transmit electrodes TE1-TE16 and the first to tenth receive electrodes RE1-RE10.

The input sensor ISU may further include first to sixteenth transmission lines TL1-TL16 and first to tenth reception lines RL1-RL10. The first to sixteenth transmission lines TL1-TL16 and the first to tenth reception lines RL1-RL10 may be arranged in the non-sensing area NSA. In an embodiment, the first to fifth reception lines RL1-RL5 may be electrically connected with one end of the first to fifth receive electrodes RE1-RE5, and the sixth to tenth reception lines RL6-RL10 may be electrically connected with the other end of the sixth to tenth receive electrodes RE6-RE10. However, the present disclosure is not limited thereto. For example, the first to sixteenth transmission lines TL1-TL16 may be electrically connected with one end of the first to sixteenth transmit electrodes TE1-TE16.

The input sensor ISU may be electrically connected with a readout circuit ROC (refer to FIG. 2) through the first to sixteenth transmission lines TL1-TL16 and the first to tenth reception lines RL1-RL10. The readout circuit ROC may control an operation of the input sensor ISU.

The readout circuit ROC may transmit a transmission signal to the first to sixteenth transmission lines TL1-TL16 and/or the first to tenth reception lines RL1-RL10 and may receive a reception signal from the first to sixteenth transmission lines TL1-TL16 and/or the first to tenth reception lines RL1-RL10.

In an embodiment, the first to sixteenth transmission lines TL1-TL16 and/or the first to tenth reception lines RL1-RL10 of the input sensor ISU may be electrically connected with auxiliary lines SSL of the display panel DP through contact holes CNT and may be electrically connected with the readout circuit ROC illustrated in FIG. 2 through the second type signal pads IS-PD. However, the present disclosure is not limited thereto.

In an embodiment, the input sensor ISU may include pads electrically connected with the first to sixteenth transmission lines TL1-TL16 and first to tenth reception lines RL1-RL10. In this case, the circuit board FCB including the readout circuit ROC may be coupled to the pads of the input sensor ISU without passing through the display panel DP.

Figure 7:
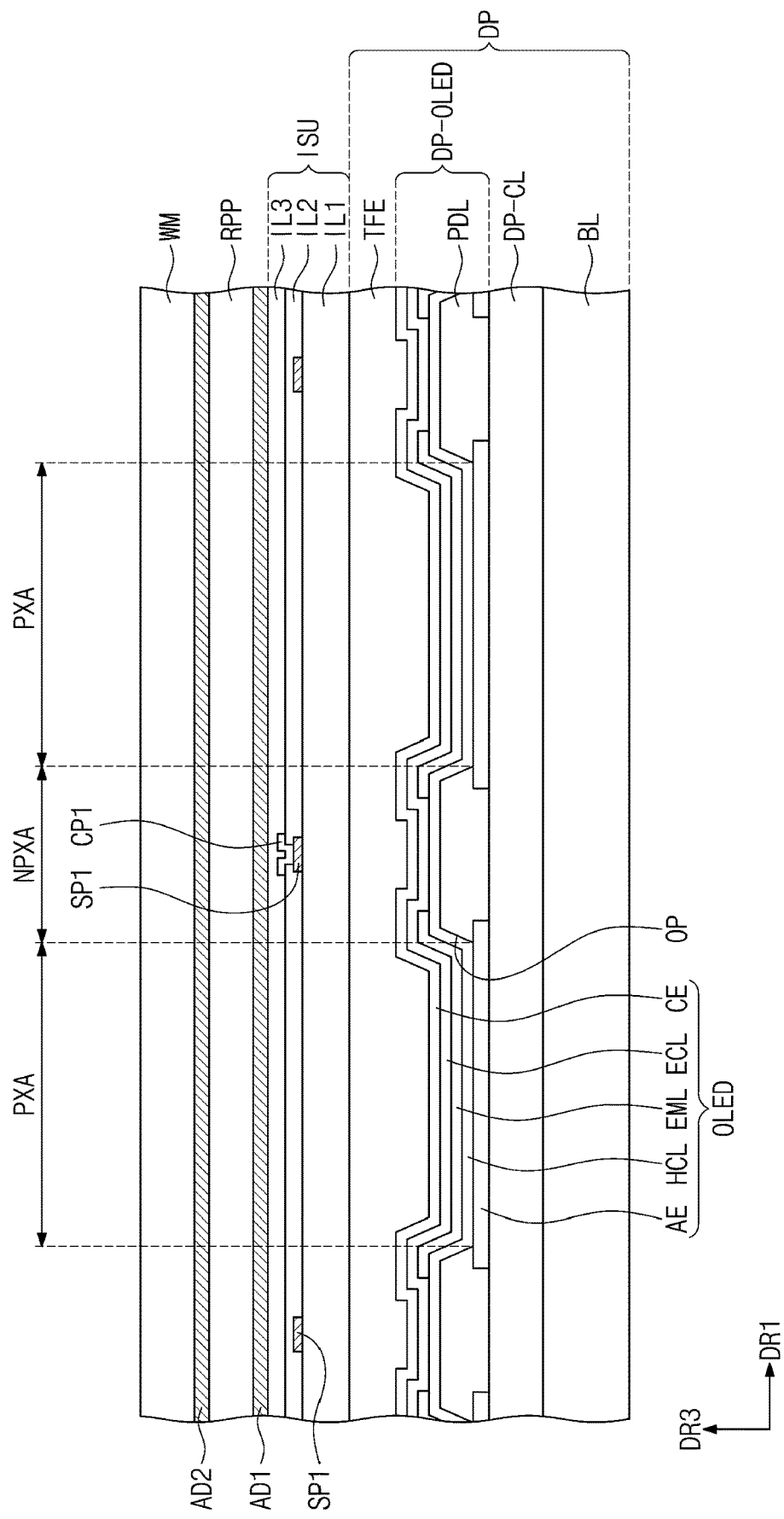
FIG. 7 is a cross-sectional view of a display device according to an embodiment of the present disclosure.

FIG. 7 is a cross-sectional view of a display device according to an embodiment of the present disclosure.

As illustrated in FIG. 7, a display panel DP may include a base layer BL, a circuit element layer DP-CL disposed on the base layer BL, a light emitting element layer DP-OLED, and a thin film encapsulation layer TFE. Although not illustrated separately, the display panel DP may further include functional layers such as an anti-reflection layer and a refractive index adjusting layer.

The base layer BL may include a synthetic resin film. A synthetic resin layer may be formed on a working substrate used in manufacturing the display panel DP. Thereafter, a conductive layer, an insulating layer, and the like may be formed on the synthetic resin layer. When the working substrate is removed, the synthetic resin layer may correspond to the base layer BL. The synthetic resin layer may be a polyimide-based resin layer, and the material of the synthetic resin layer is not specifically limited. In addition, the base layer BL may include a glass substrate, a metal substrate, or an organic/inorganic composite material substrate.

The circuit element layer DP-CL may include at least one insulating layer and a circuit element. Hereinafter, the insulating layer included in the circuit element layer DP-CL is referred to as an intermediate insulating layer. The intermediate insulating layer may include at least one intermediate inorganic layer and at least one intermediate organic layer. The circuit element may include a signal line, a pixel driving circuit, or the like. The circuit element layer DP-CL may be formed through a process of forming an insulating layer, a semiconductor layer, and a conductive layer by coating, deposition, or the like, and a process of patterning the insulating layer, the semiconductor layer, and the conductive layer by a photolithography process.

The light emitting element layer DP-OLED may include a pixel definition layer PDL and an organic light emitting diode OLED. The pixel definition layer PDL may include an organic material. A first electrode AE may be disposed on the circuit element layer DP-CL. The pixel definition layer PDL may be formed on the first electrode AE. An opening OP may be defined in the pixel definition layer PDL. The opening OP of the pixel definition layer PDL may expose at least a portion of the first electrode AE. In an embodiment of the present disclosure, the pixel definition layer PDL may be omitted.

A hole control layer HCL may be disposed on the first electrode AE. A light emitting layer EML may be disposed on the hole control layer HCL. The light emitting layer EML may be disposed in an area corresponding to the opening OP. In other words, the light emitting layer EML may be separately formed from each of pixels PX (refer to FIG. 5). The light emitting layer EML may include an organic material and/or an inorganic material. The light emitting layer EML may generate a certain color light.

An electronic control layer ECL may be disposed on the light emitting layer EML. A second electrode CE may be disposed on the electronic control layer ECL. The second electrode CE is disposed in common in the pixels PX.

The thin film encapsulation layer TFE may be disposed on the second electrode CE. The thin film encapsulation layer TFE may seal the light emitting element layer DP-OLED. The thin film encapsulation layer TFE includes at least one insulating layer. The thin film encapsulation layer TFE according to an embodiment of the present disclosure may include at least one inorganic layer (hereinafter, referred to as an encapsulation inorganic layer). The thin film encapsulation layer TFE according to an embodiment of the present disclosure may include at least one organic layer (hereinafter, referred to as an encapsulation organic layer) and at least one encapsulation inorganic layer.

The encapsulation inorganic layer may protect the light emitting element layer DP-OLED from moisture/oxygen, and the encapsulation organic layer may protect the light emitting element layer DP-OLED from a foreign material such as a dust particle. The encapsulation inorganic layer may include, but is not particularly limited to, a silicon nitride layer, a silicon oxynitride layer, a silicon oxide layer, a titanium oxide layer, or an aluminum oxide layer. The encapsulation organic layer may include, but is not particularly limited to, an acrylic-based organic layer.

The input sensor ISU may include a base layer Ill, first and second conductive layers disposed thereon, and first and second insulating layers IL2 and IL3. The base layer IL1 may include an inorganic material, for example, a silicon nitride layer. The inorganic layer disposed on the uppermost side of the thin film encapsulation layer TFE may also include silicon nitride, and the silicon nitride layer and the base layer IL1 of the thin film encapsulation layer TFE may be formed under different deposition conditions.

The first conductive layer may be disposed on the base layer ILL The first conductive layer may include a first sensing pattern SP1, a second sensing pattern SP2, and a second connection pattern CP2. The second conductive layer may be disposed on the first conductive layer. The second conductive layer may include a first connection pattern CP1. The first insulating layer IL2 may be disposed between the first conductive layer and the second conductive layer. The first insulating layer IL2 may space and separate the first conductive layer from the second conductive layer in cross-section. A contact hole for partially exposing the first sensing pattern SP1 may be provided in the first insulating layer IL2, and the first connection pattern CP1 may be connected with the first sensing pattern SP1 through the contact hole. The second insulating layer IL3 may be disposed on the first insulating layer IL2. The second insulating layer IL3 may cover the second conductive layer. The second insulating layer IL3 may protect the second conductive layer from an external environment.

Mesh lines of the first sensing pattern SP1 and the second sensing pattern SP2 may define a plurality of mesh holes. The mesh lines may have a three-layer structure of titanium/aluminum/titanium.

In the display device according to an embodiment of the present disclosure, the input sensor ISU may be directly disposed on the display panel DP. In the specification, being directly disposed means that the adhesive film is not disposed between the input sensor ISU and the display panel DP. In other words, the input sensor ISU may be formed on the display panel DP by a continuous process. In this case, the input sensor ISU may be represented as an input sensing layer.

A portion where the first electrode AE and the light emitting layer EML are arranged may be referred to as a pixel area PXA. The pixel area PXA may be disposed to be spaced apart from each other in each of a first direction DR1 (refer to FIG. 5) and the second direction DR2 (refer to FIG. 5). A non-pixel area NPAX may be disposed between the pixel areas PXA and may surround the pixel area PXA.

The anti-reflector RPP may be disposed on an upper surface of the input sensor ISU. As an example of the present disclosure, the anti-reflector RPP may include a polarizing film. The anti-reflector RPP may further include a protective film and other functional films other than the polarizing film. However, hereinafter, only the polarizing film is illustrated for convenience of description. An adhesive member AD1 may be disposed between the anti-reflector RPP and the input sensor ISU. Thus, the anti-reflector RPP may be coupled to the input sensor ISU by the adhesive member AD1. The window WM may be coupled to the anti-reflector RPP through an adhesive member AD2.

Returning to FIG. 6, the input sensor ISU may be a capacitive touch sensor. For example, any one of first to sixteenth transmit electrodes TE1-TE16 and first to tenth receive electrodes RE1-RE10 may receive a transmission signal, and the other (e.g., any of RE1-RE10 when the transmission signal is applied to any one of TE1-TE16) may output the amount of change in capacitance between the first to sixteenth transmit electrodes TE1-TE16 and the first to tenth receive electrodes RE1-RE10 as a reception signal. For example, when receiving a transmission signal (or a driving signal), the first transmit electrode TE1 may be electrostatically coupled to the first to tenth receive electrodes RE1-RE10. When a part of a user's body is located on a specific receive electrode, for example, the first receive electrode RE1 among the first to tenth receive electrodes RE1-RE10 which are electrostatically coupled, a capacity between the first transmit electrode TE1 and the first receive electrode RE1 is changed. A readout circuit ROC (refer to FIG. 2) may detect the changed capacity of the reception signal received from a first reception line RL1 connected with the first receive electrode RE1 and may calculate coordinate information about a touch location of a user.

Figure 8:
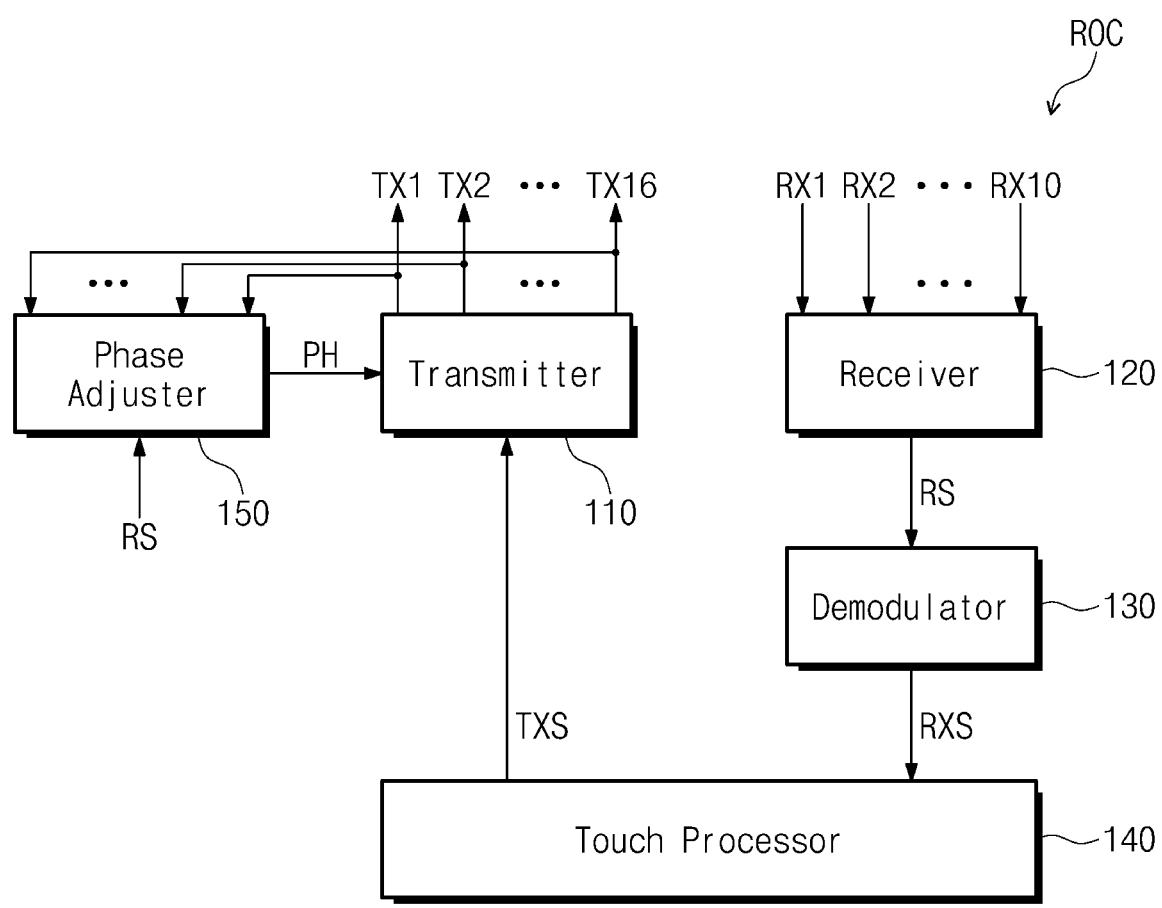
FIG. 8 is a block diagram illustrating a circuit configuration of a readout circuit according to an embodiment of the present disclosure.

FIG. 8 is a block diagram illustrating a circuit configuration of a readout circuit ROC according to an embodiment of the present disclosure. The readout circuit ROC may include a transmitter 110, a receiver 120, a demodulator 130, a touch processor 140, and a phase adjuster 150.

The touch processor 140 may control operations of the transmitter 110, the receiver 120, the demodulator 130, and the phase adjuster 150.

The touch processor 140 may generate an output signal TXS to be transmitted to an input sensor ISU (refer to FIG. 6) and may receive a signal received from the input sensor ISU as a sensing signal RXS.

The transmitter 110 may convert the output signal TXS provided from the touch processor 140 into first to sixteenth transmission signals TX1-TX16 and may provide the input sensor ISU with the first to sixteenth transmission signals TX1-TX16. The first to sixteenth transmission signals TX1-TX16 may be provided to first to sixteenth transmission lines TL1-TL16 illustrated in FIG. 6.

The receiver 120 may receive first to tenth reception signals RX1-RX10 from first to tenth reception lines RL1-RL10 illustrated in FIG. 6 and may output a reception sensing signal RS based on the reception signals RX1-RX10.

The demodulator 130 may demodulate the reception sensing signal RS to thereby generate a demodulated sensing signal RXS. The demodulated sensing signal RXS may be provided to the touch processor 140.

The touch processor 140 may calculate coordinate information about a touch location of a user in the input sensor ISU based on the output signal TXS and the sensing signal RXS.

The phase adjuster 150 may output phase adjustment signals PH based on the first to sixteenth transmission signals TX1-TX16 and the reception sensing signal RS. The phase adjustment signals PH may correspond to the first to sixteenth transmission signals TX1-TX16, respectively, and may be used to adjust relative phases of TX1-TX16.

The transmitter 110 may output the first to sixteenth transmission signals TX1-TX16 based on the output signal TXS provided from the touch processor 140 and the phase adjustment signals from the phase adjuster 150. The first to sixteenth transmission signals TX1-TX16 may correspond in phase to the phase adjustment signals PH.

A circuit configuration (shown in FIG. 19) and an operation of the phase adjuster 150 will be described in detail below.

Figure 9:
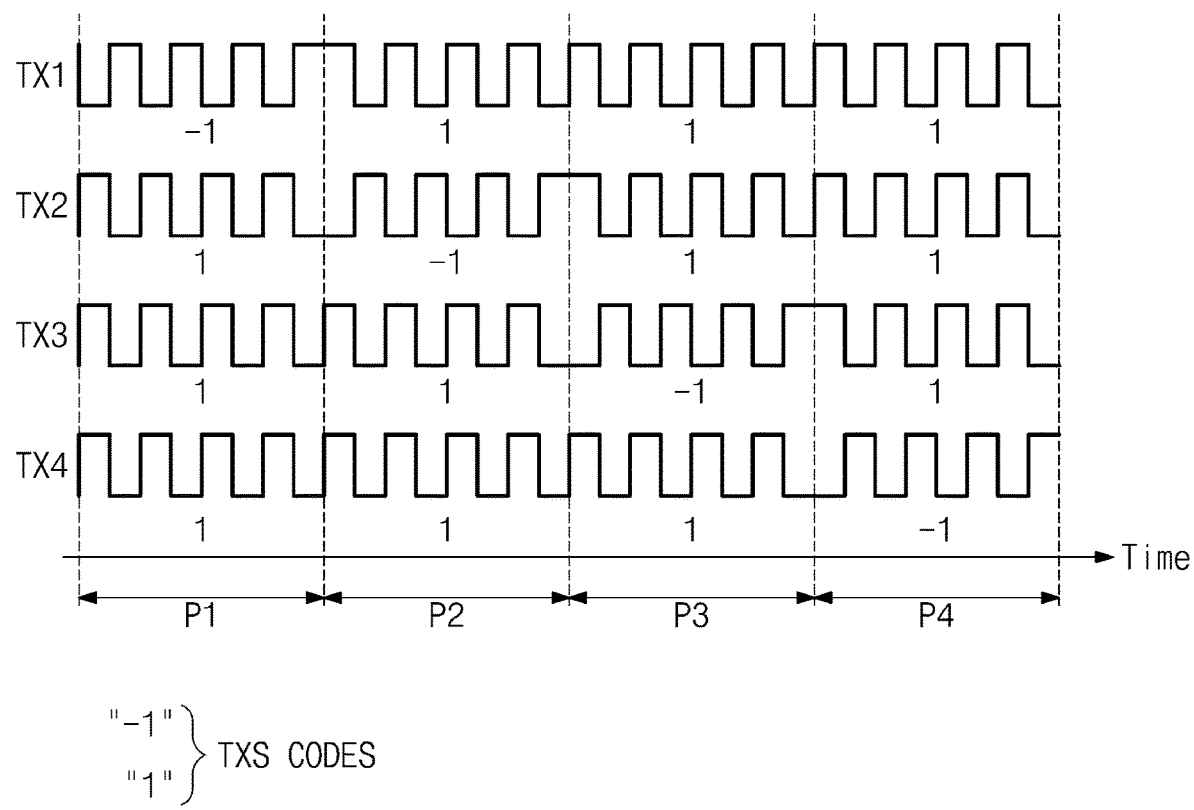
FIG. 9 illustrates first to fourth transmission signals.

FIG. 9 illustrates first to fourth transmission signals TX1-TX4, each exemplified as a square wave (or a "pulse wave"). Each of the first to fourth transmission signals TX1-TX4 may have a certain waveform depending on an output signal TXS. For example, when the code of the output signal TXS is "−1" in any given period P1, P2, P3 or P4, each of the first to fourth transmission signals TX1-TX4 may have a first waveform in that period. When the code of the output signal TXS is "1", each of the first to fourth transmission signals TX1-TX4 may have a second waveform different from the first waveform in the relevant period.

The first transmission signal TX1 may have the first waveform when the first transmission signal TX1 corresponds to code "−1" in the first period P1, and each of the second, third, and fourth transmission signals TX2, TX3, and TX4 may have the second waveform when each of the second, third, and fourth transmission signals TX2, TX3, and TX4 corresponds to code "1".

The second transmission signal TX2 may have the first waveform when the second transmission signal TX2 corresponds to code "−1" in the second period P2, and each of the first, third, and fourth transmission signals TX1, TX3, and TX4 may have the second waveform when each of the first, third, and fourth transmission signals TX1, TX3, and TX4 corresponds to code "1".

The third transmission signal TX3 may have the first waveform when the third transmission signal TX3 corresponds to code "−1" in the third period P3, and each of the first, second, and fourth transmission signals TX1, TX2, and TX4 may have the second waveform when each of the first, second, and fourth transmission signals TX1, TX2, and TX4 corresponds to code "1".

The fourth transmission signal TX4 may have the first waveform when the fourth transmission signal TX4 corresponds to code "−1" in the fourth period P4, and each of the first, second, and third transmission signals TX1, TX2, and TX3 may have the second waveform when each of the first, second, and fourth transmission signals TX1, TX2, and TX4 corresponds to code "1".

As shown in FIG. 9, an operation of simultaneously outputting the first to fourth transmission signals TX1-TX4 to first to fourth transmit electrodes TE1-TE4 (refer to FIG. 6) is referred to as multi-channel driving.

The case that each of the first to fourth transmission signals TX1-TX4 is the pulse wave is illustrated as an example in FIG. 9. However, each of the first to fourth transmission signals TX1-TX4 may be a sine wave in other examples to be discussed later.

Figure 10A:
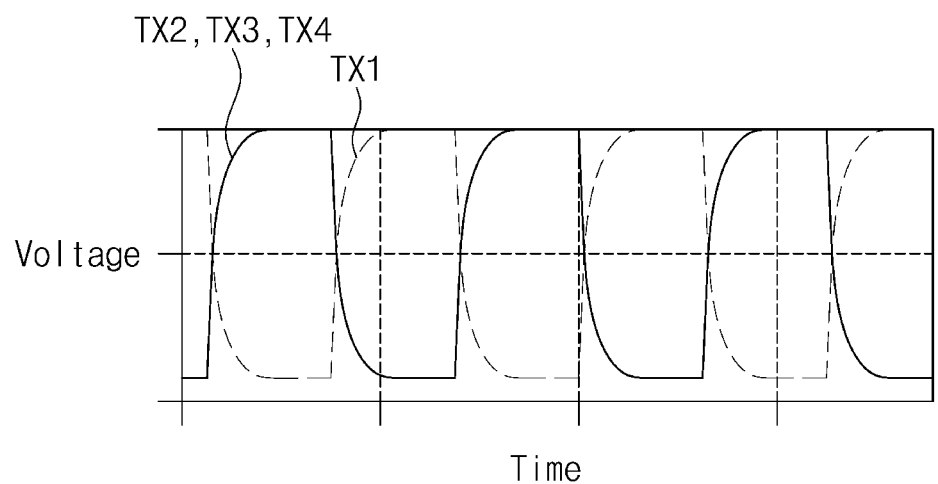
FIGS. 10A and 10B illustrate signal waveforms at one end of each of first to fourth transmission lines when each of the first to fourth transmission signals is a pulse wave, prior to phase adjustment of the present inventive concept.
Figure 10B:
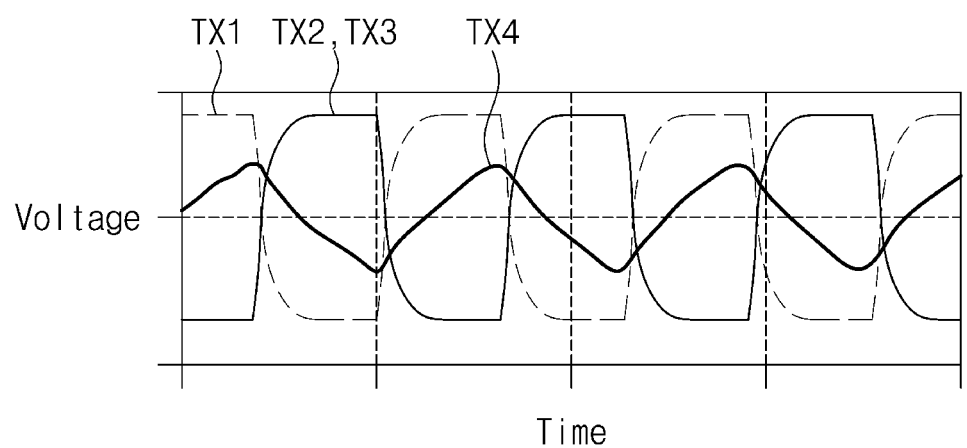

FIGS. 10A and 10B illustrate signal waveforms at one end of each of first to fourth transmission lines TL1-TL4 when each of the first to fourth transmission signals TX1-TX4 is a pulse wave.

In detail, FIGS. 10A and 10B illustrate signal waveforms at a far end (with respect to the transmitter 110 of FIG. 8) of each of the first to fourth transmission lines TL1-TL4 when the first transmission signal TX1 corresponds to code "−1" and when the second to fourth transmission signals TX2-TX4 correspond to code "1". The far end of each of the first to fourth transmission lines TL1-TL4 may be a location furthest away from the transmitter 110.

FIG. 10A illustrates signal waveforms at the far end of each of the first to fourth transmission lines TL1-TL4 when an RC delay of each of the first to fourth transmit electrodes TE1-TE4 illustrated in FIG. 6 is relatively small. In the example, the absolute values of the peak voltages of each of the signal waveforms are about the same, and the corresponding rise times and fall times are about the same.

FIG. 10B illustrates signal waveforms at the far end of each of the first to fourth transmission lines TL1-TL4 when an RC delay of each of the first to third transmit electrodes TE1-TE3 is relatively small and when an RC delay of the fourth transmit electrode TE4 is relatively large. The signal waveforms of FIG. 10B are example waveforms prior to the phase adjustment of the present inventive concept described below.

As illustrated in FIG. 10B, when the RC delay of the fourth transmit electrode TE4 is relatively large although the second to fourth transmission signals TX2-TX4 correspond to the same code "1", the fourth transmission signal TX4 may differ in waveform from the second and third transmission signals TX2 and TX3. In the example, the fourth transmission signal TX4 is attenuated in voltage and has longer edge transition times (rise and fall times) as compared to the signals TX1-TX3.

Figure 11A:
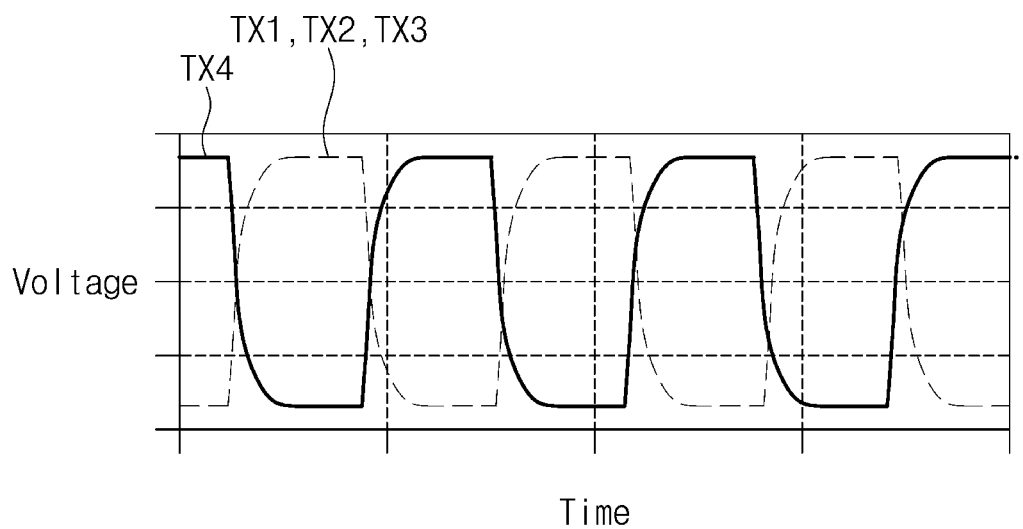
FIGS. 11A and 11B illustrate a reception signal when first to third transmission signals correspond to code "1" and a fourth transmission signal corresponds to code "−1".
Figure 11B:
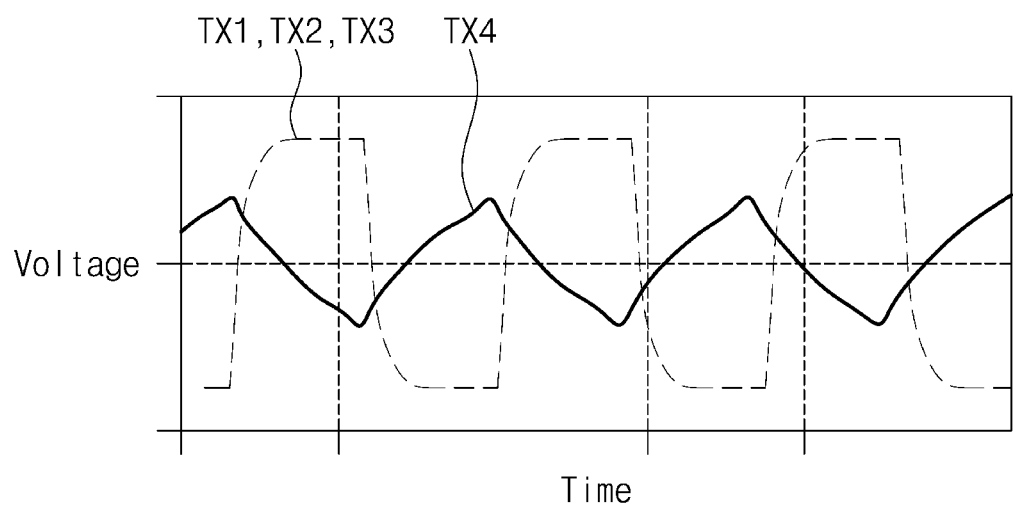

FIGS. 11A and 11B illustrate a reception signal RX when first to third transmission signals TX1-TX3 correspond to code "1" and a fourth transmission signal TX4 corresponds to code "A", and when there is no user input.

In detail, FIG. 11A illustrates first to fourth reception signals RX1-RX4 applied to the receiver 120 when an RC delay of each of the first to fourth transmit electrodes TE1-TE4 (illustrated in FIG. 6) is relatively small.

FIG. 11B illustrates first to fourth reception signals RX1-RX4 (assumed to have the same characteristics of TX1-TX4 illustrated) when an RC delay of each of the first to third transmit electrodes TE1-TE3 is relatively small and when an RC delay of the fourth transmit electrode TE4 is relatively large.

As illustrated in FIG. 11B, when the RC delay of the fourth transmit electrode TE4 is relatively large, the fourth reception signal RX4 may differ in waveform from the first to third reception signals RX1-RX3. In the example, the reception signal RX4 is attenuated and has longer edge transition times with respect to each of the reception signals RX1-RX3.

Figure 11C:
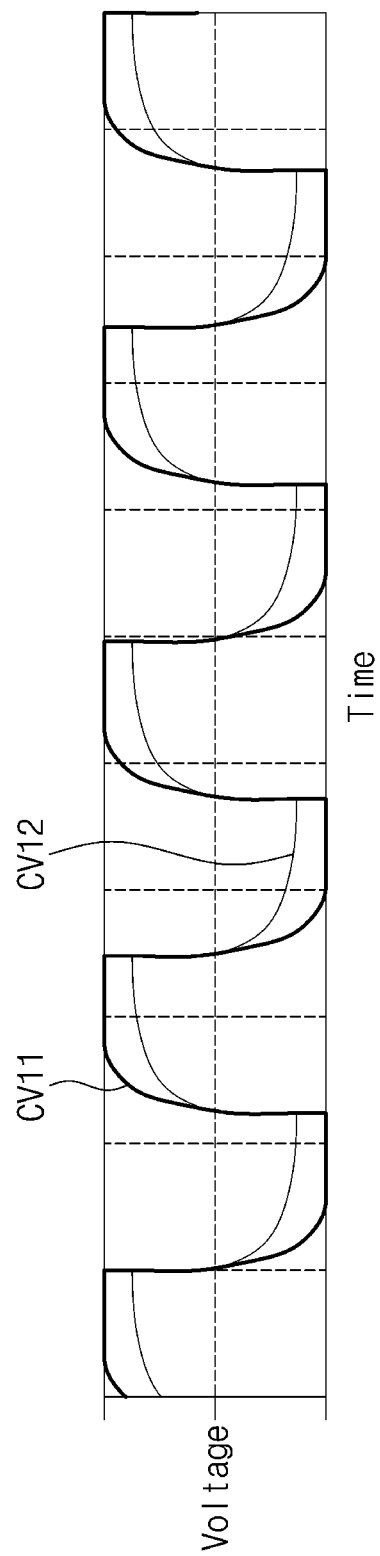
FIG. 11C illustrates a reception sensing signal output from a receiver illustrated in FIG. 8.

FIG. 11C illustrates a reception sensing signal RS output from a receiver 120 illustrated in FIG. 8. A curve CV11 illustrates the reception sensing signal RS, when the first to fourth transmission signals TX1-TX4 illustrated in FIG. 11A are provided to the first to fourth transmission lines TL1-TL4.

A curve CV12 illustrates a reception sensing signal RS output from a receiver 120 illustrated in FIG. 8 when the first to fourth transmission signals TX1-TX4 illustrated in FIG. 11B are provided to the first to fourth transmission lines TL1-TL4.

When comparing the curve CV11 with the curve CV12, it may be seen that there is a difference in amplitude (or between voltage levels), but phases are the same as each other. Thus, FIG. 11C illustrates that the receiver 120 has adjusted the phase of the signal RX4 of FIG. 11B with respect to the signals RX2-RX3 such that the reception sensing signals RX2-RX4 all have the same phase.

Figure 12A:
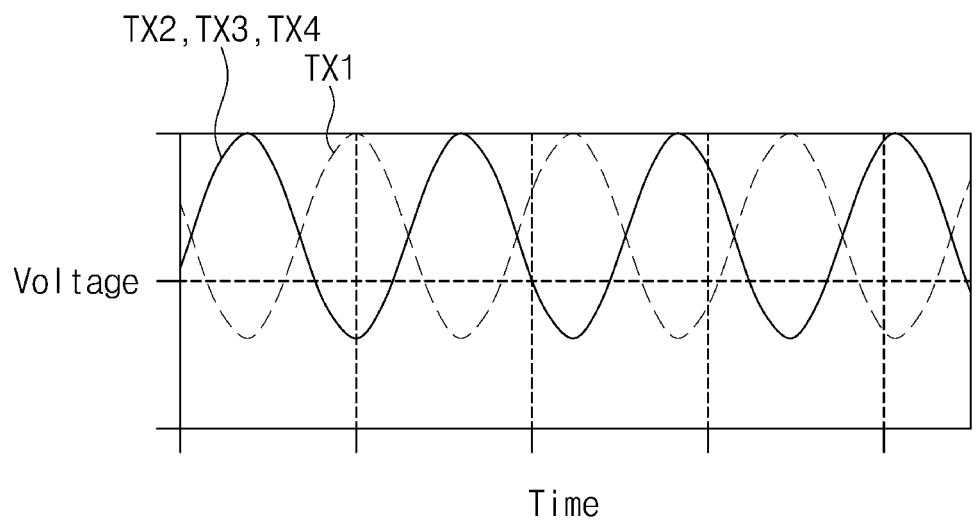
FIGS. 12A and 12B illustrate signal waveforms at one end of each of first to fourth transmission lines when each of the first to fourth transmission signals is a sine wave, prior to phase adjustment of the present inventive concept.
Figure 12B:
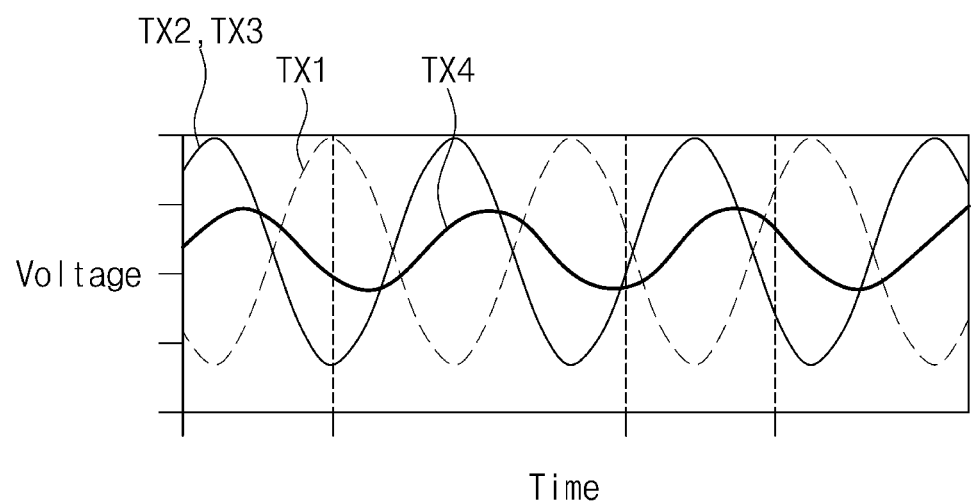

FIGS. 12A and 12B illustrate signal waveforms at a far end of each of first to fourth transmission lines TL1-TL4 when each of the first to fourth transmission signals TX1-TX4 is a sine wave, prior to phase adjustment of the present inventive concept.

In detail, FIGS. 12A and 12B illustrate signal waveforms at the far end of each of the first to fourth transmission lines TL1-TL4 when the first transmission signal TX1 corresponds to code "−1" and when the second to fourth transmission signals TX2-TX4 correspond to code "1".

FIG. 12A illustrates signal waveforms at the far end of each of the first to fourth transmission lines TL1-TL4 when an RC delay of each of the first to fourth transmit electrodes TE1-TE4 illustrated in FIG. 6 is relatively small.

FIG. 12B illustrates signal waveforms at the far end of each of the first to fourth transmission lines TL1-TL4 when an RC delay of each of the first to third transmit electrodes TE1-TE3 illustrated in FIG. 6 is relatively small and when an RC delay of the fourth transmit electrode TE4 is relatively large.

As illustrated in FIG. 12B, when the RC delay of the fourth transmit electrode TE4 is relatively large although the second to fourth transmission signals TX2-TX4 correspond to the same code "1", the fourth transmission signal TX4 may differ in waveform from the second and third transmission signals TX2 and TX3. In the example, the fourth transmission TX4 is attenuated and phase shifted with respect to the second and third transmission signals TX2 and TX3.

Figure 13A:
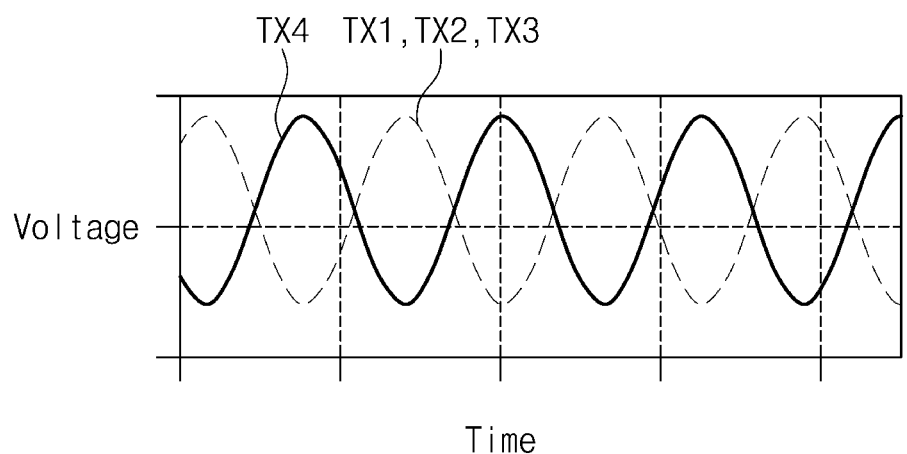
FIGS. 13A and 13B illustrate a reception signal when first to third transmission signals correspond to code "1" and a fourth transmission signal corresponds to code "−1", prior to phase adjustment of the present inventive concept.
Figure 13B:
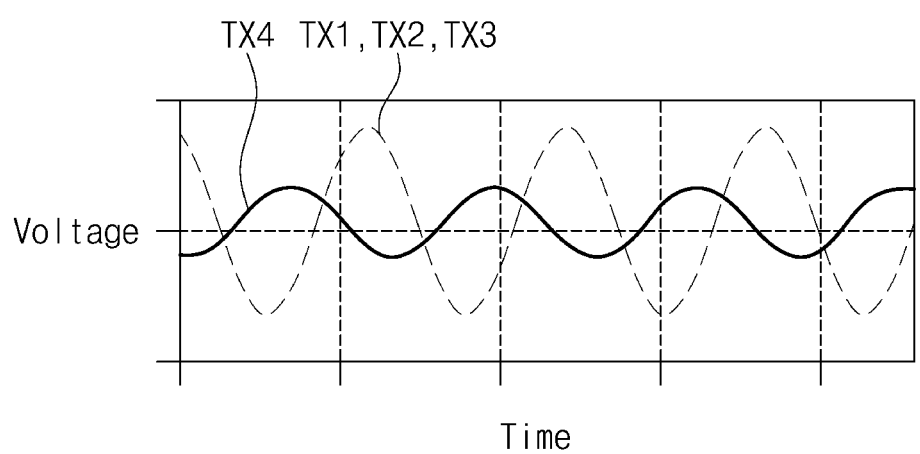

FIGS. 13A and 13B illustrate reception signals RS when first to third transmission signals TX1-TX3 correspond to code "1" and a fourth transmission signal TX4 corresponds to code "−1", prior to phase adjustment of the present inventive concept.

In detail, FIG. 13A illustrates first to fourth reception sensing signals RS1-RS4 when an RC delay of each of the first to fourth transmit electrodes TE1-TE4 illustrated in FIG. 6 is relatively small.

FIG. 13B illustrates first to fourth reception sensing signals RS1-RS4 when an RC delay of each of the first to third transmit electrodes TE1-TE3 illustrated in FIG. 6 is relatively small and when an RC delay of the fourth transmit electrode TE4 is relatively large.

As illustrated in FIG. 13B, when the RC delay of the fourth transmit electrode TE4 is relatively large, the fourth transmission signal TX4 may differ in waveform from the first to third transmission signals TX1-TX3.

Figure 13C:
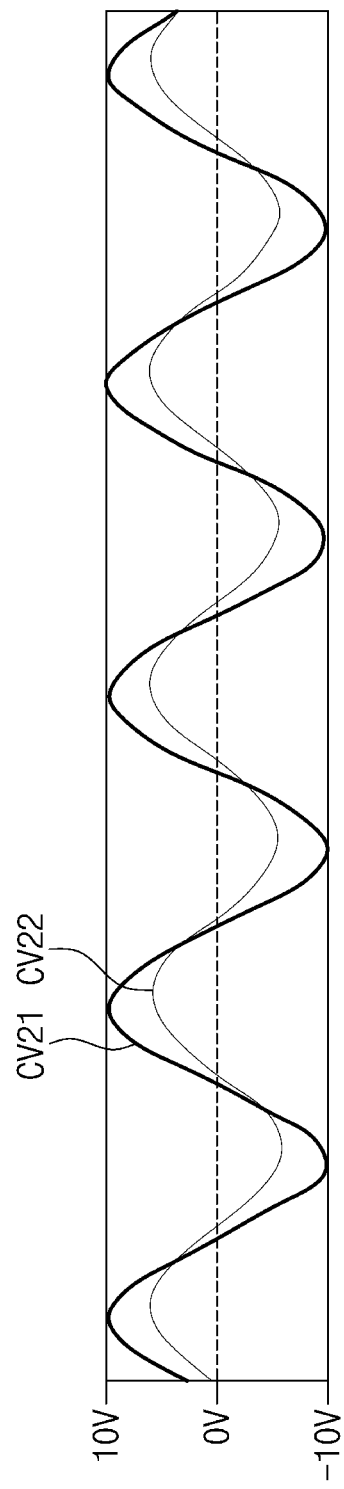
FIG. 13C illustrates a reception sensing signal output from a receiver illustrated in FIG. 8.

FIG. 13C illustrates a reception sensing signal RS output from a receiver 120 illustrated in FIG. 8.

Referring to FIG. 13C, a curve CV21 illustrates a reception sensing signal RS output from a receiver 120 illustrated in FIG. 8 when the first to fourth transmission signals TX1-TX4 illustrated in FIG. 13A are provided to the first to fourth transmission lines TL1-TL4.

A curve CV22 illustrates a reception sensing signal RS output from a receiver 120 illustrated in FIG. 8 when the first to fourth transmission signals TX1-TX4 illustrated in FIG. 13B are provided to the first to fourth transmission lines TL1-TL4.

When comparing the curve CV21 with the curve CV22, it may be seen that there is a difference in amplitude (or between voltage levels), but phases also differ from each other.

When the receiver 120 outputs the reception sensing signals RS respectively corresponding to the curves CV21 and CV22, a demodulator 130 may demodulate the reception sensing signals RS respectively corresponding to the curves CV21 and CV22 into different signals.

FIGS. 14A, 14B, and 14C are tables listing example capacitances (referred to as "Cm") between first to fourth transmit electrodes TE1-TE4 (hereafter referred to as just "TE1-TE4") and first to fourth receive electrodes RE1-RE4 (hereafter, just "RE1-RE4") when each of the first to fourth transmission signals TX1-TX4 is a pulse wave and when there is no external user input (e.g., a touch or hovering input).

In each of FIGS. 14A, 14B, and 14C, it is assumed that an RC delay of each of TE1-TE3 is relatively small. In FIG. 14A, it is assumed that the RC delay of TE4 is slightly larger than, or the same as, that of TE1-TE3. In FIG. 14B, it is assumed that the RC delay of TE4 is significantly larger than that of TE1-TE3, and in FIG. 14C, the RC delay of TE4 is even larger.

In examples illustrated in FIGS. 14A, 14B, and 14C, it may be seen that capacitances Cm between TE1-TE4 and RE1-RE4 differ from each other according to the RC delays of TE1-TE4 even though there is no external user input.

FIGS. 15A, 15B, and 15C are tables listing an example amount (referred to as "dCm") capacitance change between TE1-TE4 and RE1-RE4 when each of the first to fourth transmission signals TX1-TX4 is a pulse wave and when there is an external user input. The amount dCm of capacitance change in capacitance is a difference value between capacitances Cm between TE1-TE4 and RE1-RE4 when there is no external user input and capacitances between TE1-TE4 and RE1-RE4 after there is an external user input.

In each of FIGS. 15A, 15B, and 15C, it is assumed that there is an external user input at a location corresponding to the fourth transmit electrode TE4 and the third receive electrode RE3. Furthermore, it is assumed that an RC delay of each of the first to third transmit electrodes TE1-TE3 is small and an RC delay of the fourth transmit electrode TE4 is relatively large. Furthermore, the results of FIGS. 15A, 15B and 15C may correspond to the inter-electrode capacitance conditions of the tables of FIGS. 14A, 14B and 14C, respectively.

In examples illustrated in FIGS. 15A, 15B, and 15C, it may be seen that the amounts dCm of change in capacitance between TE1-TE4 and RE1-RE4 after there is an external user input differ from each other according to the RC delays of TE1-TE4.

FIGS. 16A, 16B, and 16C are tables listing example capacitances (referred to as "Cm") between TE1-TE4 and RE1-RE4 when each of the first to fourth transmission signals TX1-TX4 is a sine wave and when there is no external user input (e.g., a touch or hovering input).

In FIG. 16A, it is assumed that the RC delay of each of TE1 to TE4 is relatively small. In each of FIGS. 16B and 16C, it is assumed that an RC delay of each of the first to third transmit electrodes TE1-TE3 is small and an RC delay of the fourth transmit electrode TE4 is relatively large. Furthermore, FIG. 16B shows a greater RC delay of the fourth transmit electrode TE4 than that of FIG. 16A, and FIG. 16C shows a greater RC delay of the fourth transmit electrode TE4 than that of FIG. 16B.

In examples illustrated in FIGS. 16A, 16B, and 16C, it may be seen that capacitances Cm (correlated with the listed RC delays) between the first to fourth transmit electrodes TE1-TE4 and the first to fourth receive electrodes RE1-RE4 differ from each other according to the RC delays of the first to fourth transmit electrodes TE1-TE4 even though there is no external user input.

FIGS. 17A, 17B, and 17C are tables listing example amounts dCm of capacitance change between first to fourth transmit electrodes TE1-TE4 and first to fourth receive electrodes RE1-RE4 when each of the first to fourth transmission signals TX1-TX4 is a sine wave and when there is an external user input.

In each of FIGS. 17A, 17B, and 17C, it is assumed that there is an external user input at a location corresponding to the fourth transmit electrode TE4 and the third receive electrode RE3. Furthermore, it is assumed that an RC delay of each of the first to third transmit electrodes TE1-TE3 is small and an RC delay of the fourth transmit electrode TE4 is relatively large. Furthermore, FIG. 17B is greater in the RC delay of the fourth transmit electrode TE4 than FIG. 17A, and FIG. 17C is greater in the RC delay of the fourth transmit electrode TE4 than FIG. 17B.

In examples illustrated in FIGS. 17A, 17B, and 17C, it may be seen that the amounts dCm of capacitance change between respective transmit/receive pairs of the first to fourth transmit electrodes TE1-TE4 and the first to fourth receive electrodes RE1-RE4, after there is an external user input differ from each other according to the RC delays of the first to fourth transmit electrodes TE1-TE4.

In addition, when the RC delay of the fourth transmit electrode TE4 is large, as illustrated in FIGS. 17B and 17C, "false capacitances" fCm1 and fCm2 may be generated. Herein, a false capacitance is a detected change in capacitance dCm that occurs at an intersection between transmit and receive electrodes when an external user input is made at a different intersection between transmit and receive electrodes. For example, in FIGS. 17B and 17C, although there is no external user input at the intersections of RE3 with TE1, TE2 or TE3, the amounts dCm of capacitance change at those intersections is non-negligible and results in the false capacitances fCm1 and fCm2 (prior to phase adjustments of the present inventive concept).

Figure 18A:
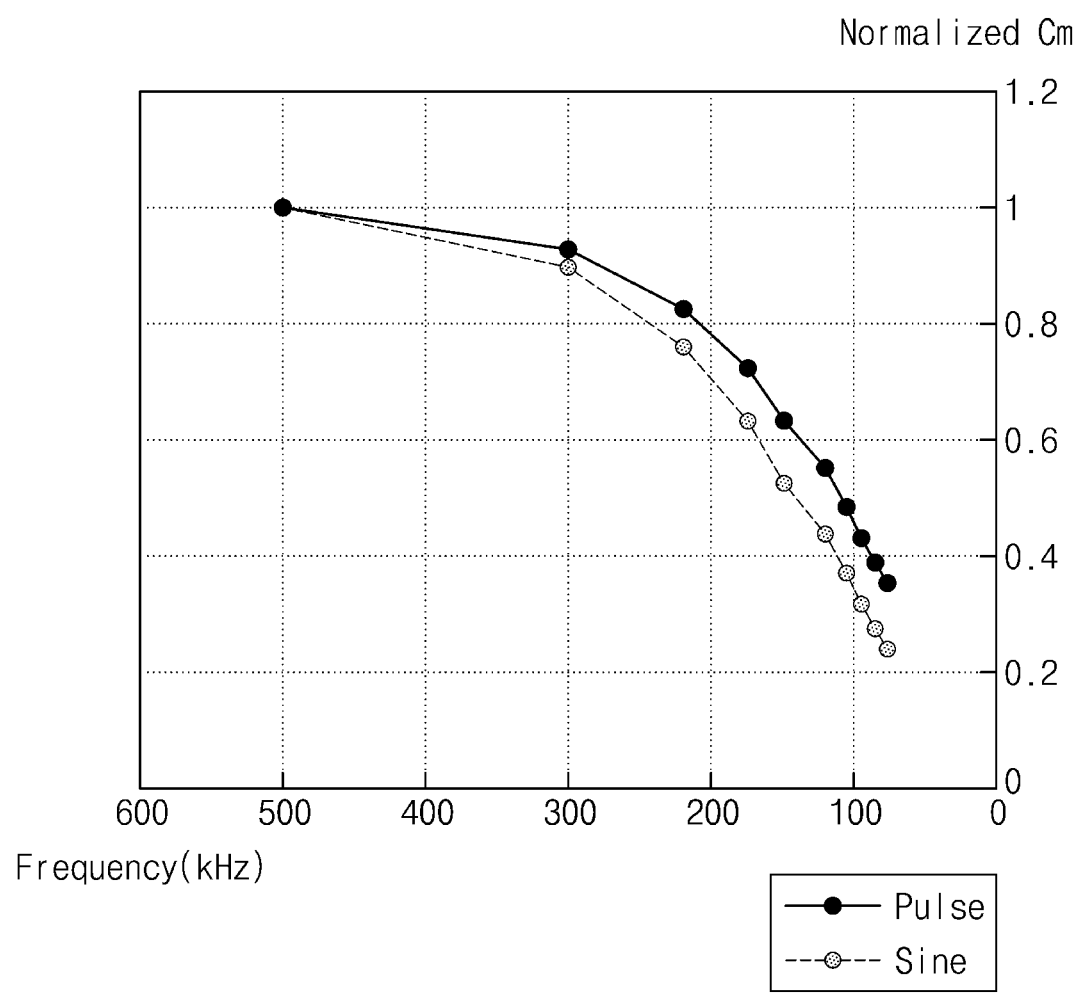
FIG. 18A is a drawing illustrating a difference in capacitance between a fourth transmit electrode and a third receive electrode according to an RC delay of the fourth transmit electrode when each of first to fourth transmission signals is a pulse wave and a sine wave.

FIG. 18A is a graph illustrating a difference in capacitance Cm between a fourth transmit electrode TE4 and a third receive electrode RE3 according to an RC delay of the fourth transmit electrode TE4 when each of first to fourth transmission signals TX1-TX4 is a pulse wave (continuous line) and a sine wave (dotted line).

In FIG. 18A, the horizontal axis represents frequency, and the curve illustrates an RC delay of the fourth transmission signal TX4 provided to the fourth transmit electrode TE4 as a function of frequency. The vertical axis indicates a value obtained by normalizing the capacitance Cm.

As shown in, when the fourth transmission signal TX4 is a pulse wave (solid line) or a sine wave (dotted line) when there is no external user input, a difference in capacitance Cm between the fourth transmit electrode TE4 and the third receive electrode RE3 is small. However, as the RC delay of the fourth transmission signal TX4 is increased (as the frequency is lower), the capacitance Cm of the fourth transmission signal TX4 (correlated with RC delay) may decrease.

Figure 18B:
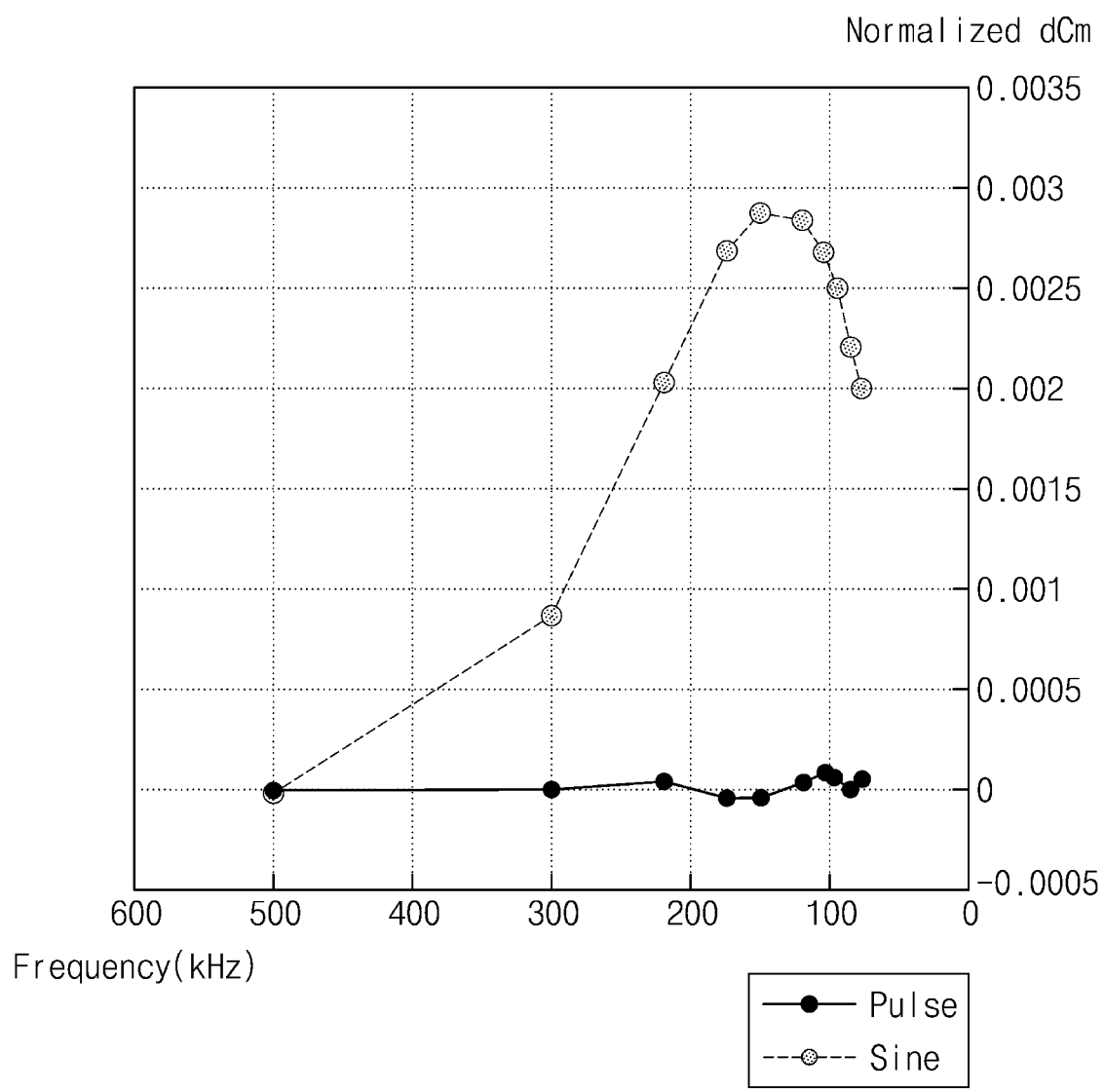
FIG. 18B is a drawing illustrating a difference in the amount of change in capacitance between a third transmit electrode and a third receive electrode according to an RC delay of a fourth transmit electrode when each of first to fourth transmission signals is a pulse wave and a sine wave.

FIG. 18B is a graph illustrating a difference in the amount dCm of change in capacitance between a third transmit electrode TE3 and a third receive electrode RE3 according to an RC delay of a fourth transmit electrode TE4 when each of first to fourth transmission signals TX1-TX4 is a pulse wave (solid line) or a sine wave (dotted line).

In FIG. 18B, the horizontal axis indicates frequency, and the curve illustrates an RC delay of the fourth transmission signal TX4 provided to the fourth transmit electrode TE4 as a function of frequency. The vertical axis indicates a value obtained by normalizing the amount dCm of change in capacitance.

As described with reference to FIGS. 15A to 15C, after there is an external user input when each of the first to fourth transmission signals TX1-TX4 is the pulse wave, the amount dCm of change in capacitance between the third transmit electrode TE3 and the third receive electrode RE3 may be negligible ("0").

As described with reference to FIGS. 17A to 17C, after there is an external user input when each of the first to fourth transmission signals TX1-TX4 is the sine wave, the amount dCm of change in capacitance between the third transmit electrode TE3 and the third receive electrode RE3 may not be detectable (not "0").

In an example illustrated in FIG. 18B, the amount dCm of change in capacitance between the third transmit electrode TE3 and the third receive electrode RE3 may be large, according to an RC delay of the fourth transmission signal TX4.

Figure 19:
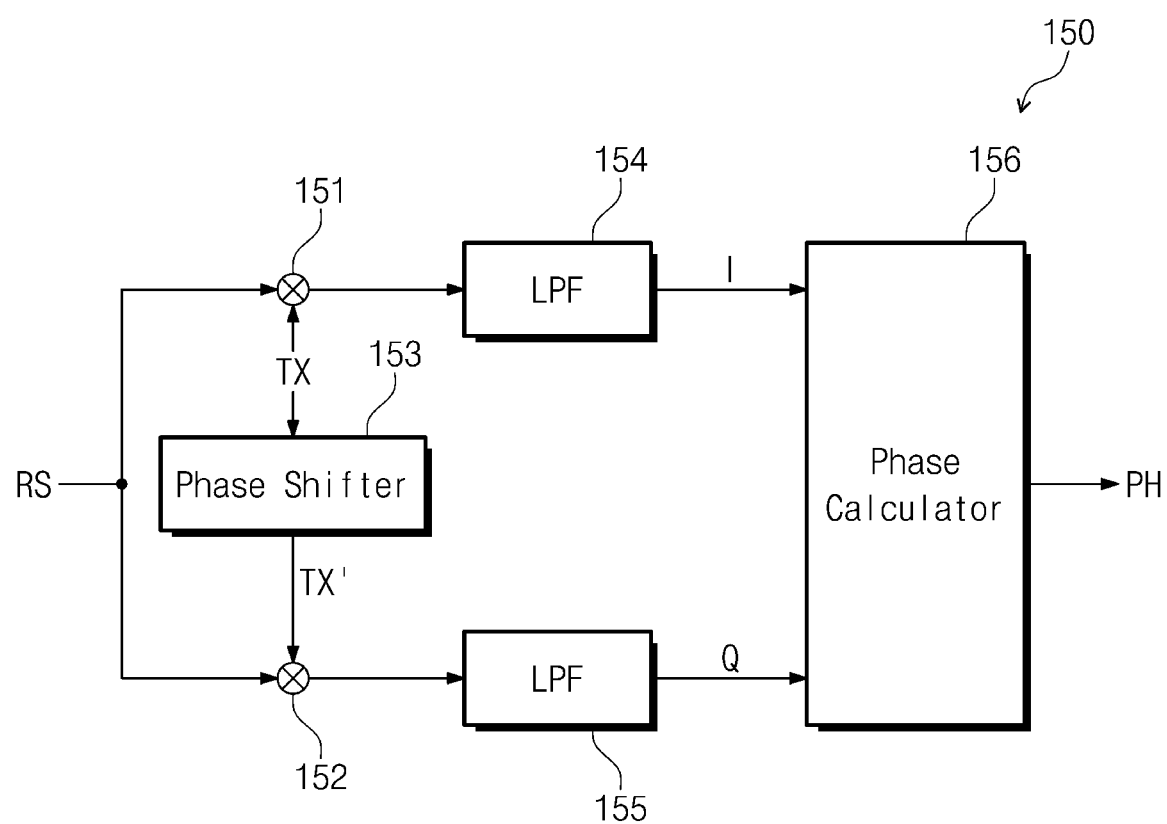
FIG. 19 is a block diagram of a phase adjuster according to an embodiment of the present disclosure.

FIG. 19 is a block diagram of a phase adjustment circuit (hereafter, "phase adjuster") according to an embodiment of the present disclosure.

Referring to FIG. 19, a phase adjuster 150 may output a phase control signal PH based on a phase difference between a reception sensing signal RS and a transmission signal TX. The phase adjuster 150 may include arithmetic operator circuits (hereafter, "operators") 151 and 152, a phase shifter 153, a first filter 154, a second filter 155, and a phase calculator (e.g., circuit) 156.

The operator 151 may be a logic circuit that performs an arithmetic operation (e.g., multiplication) on the reception sensing signal RS and the transmission signal TX (e.g., using samples of the signals RS and TX as inputs). In an embodiment, the operator 151 may be a multiplier.

The phase shifter 153 may shift a phase of the transmission signal TX and may output the shifted transmission signal TX'. In an embodiment, the phase shifter 153 may shift the phase of the transmission signal TX by 90 degrees (90°) and may output the shifted transmission signal TX'.

In an embodiment, the transmission signal TX may be one of first to sixteenth transmission signals TX1-TX16 output from a transmitter 110 illustrated in FIG. 8. In an embodiment, the first to sixteenth transmission signals TX1-TX16 may be sequentially provided as the transmission signal TX to the operator 151 and the phase shifter 153.

The operator 152 may be a logic circuit that performs an arithmetic operation (e.g., multiplication) on the reception sensing signal RS and the shifted transmission signal TX'. In an embodiment, the operator 152 may be a multiplier.

The first filter 154 may output a first signal I (first filtered signal) obtained by filtering the output signal of the operator 151. The first filter 154 may be a low pass filter which passes a low frequency band of the first signal I.

The second filter 155 may output a second signal Q (second filtered signal) obtained by filtering the output signal of the operator 152. The second filter 155 may be a low pass filter which passes a low frequency band of the second signal Q.

The phase calculator 156 may calculate a phase difference between the transmission signal and the reception sensing signal RS based on the first signal I and the second signal Q.

The magnitude M of the reception sensing signal RS may be calculated by Equation 1 below.

$$M = \sqrt{I^2 + Q^2} \quad \text{[Equation 1]}$$

The phase difference θ may be calculated by Equation 2 below.

$$\theta = \tan^{-1}\frac{Q}{I} \quad \text{[Equation 2]}$$

The phase calculator 156 may output a phase adjustment signal PH based on the phase difference θ. In an embodiment, the phase calculator 156 may output the phase adjustment signals PH respectively corresponding to the first to sixteenth transmission signals TX1-TX16.

A transmitter 110 illustrated in FIG. 8 may output the first to sixteenth transmission signals TX1-TX16 based on the output signal TXS provided from a touch processor 140 and the phase adjustment signals from the phase adjuster 150. The first to sixteenth transmission signals TX1-TX16 may correspond in phase to the phase adjustment signals PH.

For example, as illustrated in FIG. 12B, although the second, third, and fourth transmission signals TX2, TX3, and TX4 should be the same in phase as each other, when the fourth transmission signal TX4 differs in phase from the second and third transmission signals TX2 and TX3, the phase adjuster 150 may adjust and output the phase of the fourth transmission signal TX4.

As the fourth transmission signal TX4, the phase of which is compensated with regard to the RC delay of the fourth transmit electrode TE4, is provided to the fourth transmit electrode TE4, a capacitance Cm (refer to FIG. 18A) may be prevented from being reduced and false capacitances fCm1 and fCm2 (refer to FIGS. 17B and 17C) may be prevented from being generated or may be minimized.

In an embodiment illustrated in FIG. 12A, phases of the second, third, and fourth transmission signals TX2, TX3, and TX4 are the same as each other when the first transmission signal TX1 corresponds to code "−1" and when the second, third, and fourth transmission signals TX2, TX3, and TX4 correspond to code "1".

When an RC delay of each of first to third transmit electrodes TE1-TE3 illustrated in FIG. 6 is small and when an RC delay of fourth transmit electrode TE4 is relatively large, as illustrated in FIG. 12B, although the second, third, and fourth transmission signals TX2, TX3, and TX4 correspond to the same code "1", the fourth transmission signal TX may differ in waveform from the second and third transmission signals TX2 and TX3.

When the phase adjuster 150 compensates for the phase of the fourth transmission signal TX4 provided to the fourth transmit electrode TE4 when the RC delay of the fourth transmit electrode TE4 is large, the fourth transmission signal TX4 may have the same phase as the second and third transmission signals TX2 and TX3 provided to the second and third transmit electrodes TE2 and TE3, the RC delay of which is small.

A phase corresponding to the phase adjustment signal PH output from the phase adjuster 150 may be less than a phase difference between the first transmission signal TX1 and the fourth transmission signal TX4. For example, as illustrated in FIG. 12A, when the phase difference between the first transmission signal TX1 and the fourth transmission signal TX4 is 90°, the phase corresponding to the phase adjustment signal PH may be less than 90°.

In an alternative embodiment, a waveform analyzer and comparator type processing circuit may be substituted for the circuitry of FIG. 19. This type of circuit may sample and analyze the waveforms of the reception sensing signal and the transmission signal, and generate the phase adjustment signal based on an analysis of the waveform differences, e.g., comparing the timing of the peaks and nulls in the respective signals and arriving at a phase difference based on an offset in the timing.

FIG. 20A is a table listing example capacitances according to a phase adjustment signal PH.

Figure 20B:
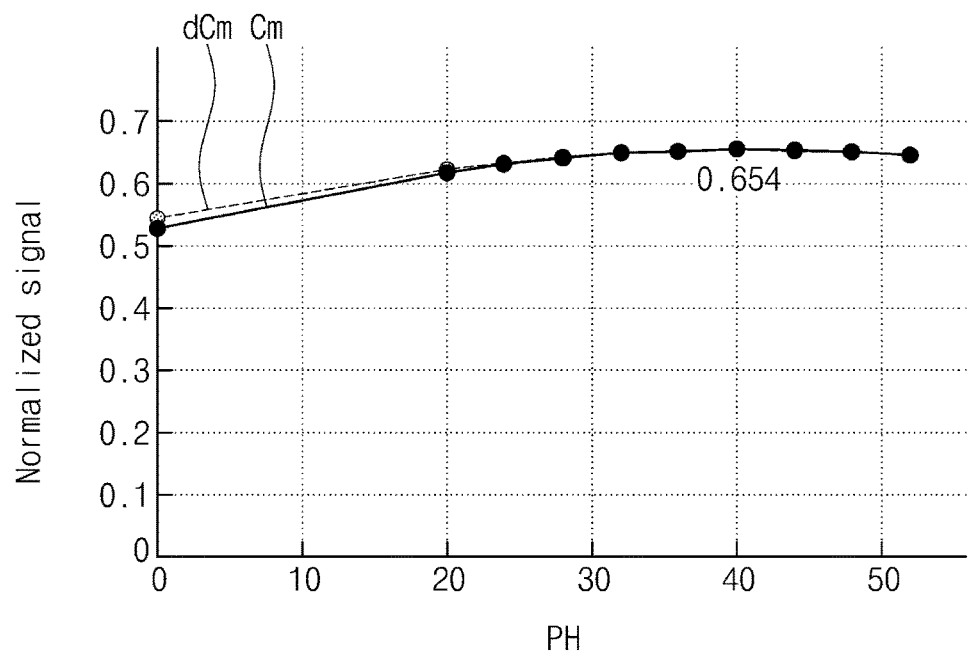
FIG. 20B is a drawing illustrating a capacitance according to a phase adjustment signal and the amount of change in capacitance.

FIG. 20B is a graph illustrating an example capacitance Cm according to a phase signal PH and an amount dCm of change in capacitance.

Figure 20C:
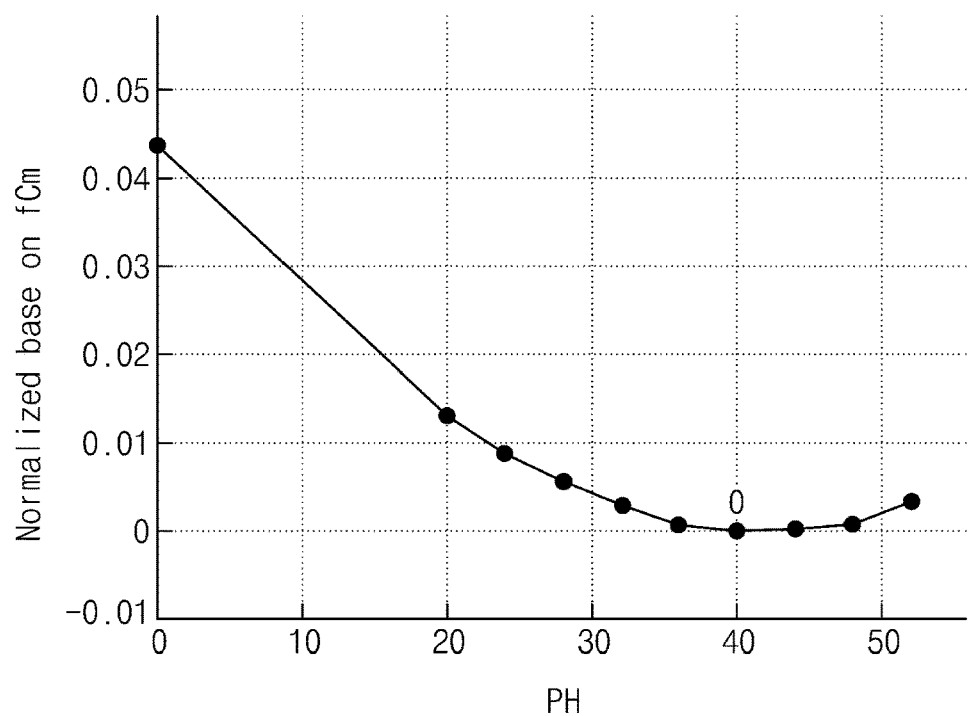
FIG. 20C is a drawing illustrating false capacitances according to a phase adjustment signal.

FIG. 20C is a graph illustrating example false capacitances fCm according to a phase adjustment signal PH.

In FIGS. 20A, 20B, and 20C, a capacitance Cm is a capacitance between a fourth transmit electrode TE4 and a third receive electrode RE3 when there is no external user input. The amount dCm of change in capacitance is the amount of change in capacitance between the fourth transmit electrode TE4 and the third receive electrode RE3 when there is an external user input at a location corresponding to the fourth transmit electrode TE4 and the third receive electrode RE3. A false capacitance fCm is a false capacitance between a third transmit electrode TE3 and the third receive electrode RE3 when there is an external user input at a location corresponding to the fourth transmit electrode TE4 and the third receive electrode RE3.

In FIGS. 20A, 20B, and 20C, values obtained by normalizing a capacitance Cm, the amount dCm of change in capacitance, and a false capacitance fCm for the fourth transmit electrode TE4, the RC delay of which is large, on the basis of a capacitance Cm, the amount dCm of change in capacitance, and a false capacitance fCm for a transmit electrode, the RC delay of which is small, among first to sixteenth transmit electrodes TE1 (refer to FIG. 16) are illustrated.

Referring to FIGS. 20A and 20B, when the phase adjustment signal PH is 40, that is, when the phase of the fourth transmission signal TX4 is adjusted by 40°, each of the normalized capacitance Cm and the normalized amount dCm of change in capacitance for the fourth transmission signal TX4 has a maximum value (0.654).

Referring to FIGS. 20A and 20C, when the phase adjustment signal PH is 40, that is, when the phase of the fourth transmission signal TX4 is adjusted by 40°, the normalized false capacitance fCm for the fourth transmission signal TX4 has a minimum value (0).

In an embodiment, in the manufacturing testing and calibration stage of the display device DD, as described with reference to that illustrated in FIG. 20A, a phase adjuster 150 illustrated in FIG. 8 may set the phase adjustment signal PH, in which each of the normalized capacitance Cm and the normalized amount dCm of change in capacitance has the maximum value and the normalized false capacitance fCm has the minimum value, to a phase of each of the first to sixteenth transmission signals TX1-TX16, while sequentially changing the phase adjustment signal from "0" to "52".

The input sensing device having such a configuration may set a phase of a transmission signal provided to each of channels with regard to a characteristic of each of the channels. Therefore, an error of a reception signal may be minimized according to a characteristic deviation between the channels. Thus, the input sensing performance of the input sensing device provided in the display device may be improved.

In the embodiment described above in connection with FIGS. 6-8, 19 and 20A-20C, the first to sixteenth transmit electrodes TE1 to TE16 of the transmit electrode may each be referred to as a transmit sub-electrode of the transmit electrode, and the first to tenth receive electrodes RE1 to RE10 may each be referred to as a receive sub-electrode of the receive electrode. As exemplified in the discussion of FIGS. 19-20C, a method of calibrating an image sensor may include setting a relative phase for each first transmission signal to be output to a first transmit sub-electrode (e.g., TE4 in the example above) among the transmit sub-electrodes TE1-TE16, with respect to a phase of at least one further transmission signal to be output to at least one further transmit sub-electrode (e.g., TE1, TE2 and/or TE3) among the transmit sub-electrodes. The relative phase may be set by measuring a false capacitance of the first transmit sub-electrode based on a measurement of a phase difference between a test transmission signal applied to the first transmit sub-electrode and a test reception sensing signal received by a first one of the receive sub-electrodes, and determining a relative phase (e.g., corresponding to PH=40 or 44 in FIG. 20A) that minimizes false capacitance fCm between the first transmit electrode and the first one of the receive sub-electrodes.

While the present disclosure has been described with reference to embodiments thereof, it will be apparent to those of ordinary skill in the art that various changes and modifications may be made thereto without departing from the spirit and scope of the present disclosure as set forth in the following claims. Thus, the technical scope of the present disclosure is not limited to the contents described in the detailed description but shall be determined by the accompanying claims.

What is claimed is:

1. An input sensing device, comprising:
   an input sensor comprising a transmit electrode and a receive electrode; and
   a readout circuit configured to drive the input sensor, wherein the readout circuit includes:
   a phase adjustment circuit configured to output a phase adjustment signal corresponding to a delay characteristic of the transmit electrode; and
   a transmitter configured to output a transmission signal, a phase of which is adjusted in response to the phase adjustment signal, to the transmit electrode.

2. The input sensing device of claim 1, wherein the transmission signal is a sine wave.

3. The input sensing device of claim 1, wherein the readout circuit further comprises:
   a receiver configured to receive a reception signal from the receive electrode and output a reception sensing signal.

4. The input sensing device of claim 3, further comprising:
   a transmission line electrically connecting the transmit electrode with the transmitter; and a reception line electrically connecting the receive electrode with the receiver.

5. The input sensing device of claim 3, wherein the phase adjustment circuit outputs the phase adjustment signal based on a phase difference between the transmission signal and the reception sensing signal.

6. The input sensing device of claim 3, wherein the phase adjustment circuit comprises:
a phase shifter configured to shift a phase of the transmission signal and output a shifted transmission signal;
a first arithmetic operator circuit configured to perform an arithmetic operation on the reception sensing signal and the transmission signal;
a first filter configured to filter an output of the first arithmetic operator circuit and thereby output a first filtered signal;
a second arithmetic operator circuit configured to perform an arithmetic operation on the reception sensing signal and the shifted transmission signal;
a second filter configured to filter an output of the second arithmetic operator circuit and thereby output a second filtered signal; and
a phase calculator circuit configured to output the phase adjustment signal based on the first filtered signal and the second filtered signal.

7. The input sensing device of claim 6, wherein each of the first filter and the second filter is a low pass filter.

8. The input sensing device of claim 1, wherein the transmit electrode comprises a first transmit electrode and a second transmit electrode, and
wherein the transmitter outputs a first transmission signal corresponding to a first code to the first transmit electrode and outputs a second transmission signal corresponding to a second code different from the first code to the second transmit electrode.

9. The input sensing device of claim 8, wherein the first transmission signal and the second transmission signal are offset in phase from one another.

10. The input sensing device of claim 9, wherein the phase adjustment signal comprises a first phase adjustment signal and a second phase adjustment signal, and
wherein the transmitter outputs the first transmission signal, a phase of which is adjusted according to the first phase adjustment signal, to the first transmit electrode and outputs the second transmission signal, a phase of which is adjusted according to the second phase adjustment signal, to the second transmit electrode.

11. The input sensing device of claim 10, wherein a first phase corresponding to the first phase adjustment signal is less than a phase difference between the first transmission signal and the second transmission signal, and
wherein a second phase corresponding to the second phase adjustment signal is less than the phase difference between the first transmission signal and the second transmission signal.

12. A display device, comprising:
a display panel;
an input sensor disposed on the display panel and comprising a transmit electrode and a receive electrode; and
a readout circuit configured to output a transmission signal to the transmit electrode and receive a reception signal from the receive electrode,
wherein the readout circuit comprises:

a phase adjustment circuit configured to output a phase adjustment signal corresponding to a delay characteristic of the transmit electrode; and
a transmitter configured to output the transmission signal, a phase of which is adjusted in response to the phase adjustment signal, to the transmit electrode.

13. The display device of claim 12, wherein the readout circuit further comprises:
a receiver configured to receive the reception signal from the receive electrode and output a reception sensing signal based on the reception signal.

14. The display device of claim 13, wherein the phase adjustment circuit outputs the phase adjustment signal based on a phase difference between the transmission signal and the reception sensing signal.

15. The display device of claim 13, wherein the phase adjustment circuit comprises:
a phase shifter configured to shift a phase of the transmission signal and output a shifted transmission signal;
a first operator configured to perform an arithmetic operation on the reception sensing signal and the transmission signal;
a first filter configured to filter an output of the first operator and output a first filtered signal;
a second operator configured to perform an arithmetic operation on the reception sensing signal and the shifted transmission signal;
a second filter configured to filter an output of the second operator and output a second filtered signal; and
a phase calculator configured to output the phase adjustment signal based on the first filtered signal and the second filtered signal.

16. The display device of claim 15, wherein each of the first filter and the second filter is a low pass filter.

17. The display device of claim 12, wherein the transmit electrode comprises a first transmit electrode and a second transmit electrode, and
wherein the transmitter outputs a first transmission signal corresponding to a first code to the first transmit electrode and outputs a second transmission signal corresponding to a second code different from the first code to the second transmit electrode.

18. The display device of claim 17, wherein the first transmission signal and the second transmission signal have different phases.

19. The display device of claim 18, wherein the phase adjustment signal comprises a first phase adjustment signal and a second phase adjustment signal, and
wherein the transmitter outputs the first transmission signal, a phase of which is adjusted in response to the first phase adjustment signal, to the first transmit electrode and outputs the second transmission signal, a phase of which is adjusted in response to the second phase adjustment signal, to the second transmit electrode.

20. The display device of claim 19, wherein a first phase corresponding to the first phase adjustment signal is less than a phase difference between the first transmission signal and the second transmission signal, and
wherein a second phase corresponding to the second phase adjustment signal is less than the phase difference between the first transmission signal and the second transmission signal.

* * * * *